US012628202B2

(12) United States Patent
Xin et al.

(10) Patent No.: US 12,628,202 B2
(45) Date of Patent: May 12, 2026

(54) TRANSMITTING AND RECEIVING VIA REMOTE RADIO HEAD

(71) Applicants: SONY GROUP CORPORATION, Tokyo (JP); SONY CORPORATION OF AMERICA, New York, NY (US)

(72) Inventors: Liangxiao Xin, Santa Clara, CA (US); Li-Hsiang Sun, San Jose, CA (US); Qing Xia, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 462 days.

(21) Appl. No.: 18/198,071

(22) Filed: May 16, 2023

(65) Prior Publication Data

US 2023/0403741 A1     Dec. 14, 2023

Related U.S. Application Data

(60) Provisional application No. 63/366,055, filed on Jun. 8, 2022.

(51) Int. Cl.
*H04W 74/0816*     (2024.01)
*H04W 88/08*     (2009.01)

(52) U.S. Cl.
CPC ...... *H04W 74/0816* (2013.01); *H04W 88/085* (2013.01)

(58) Field of Classification Search
CPC .................... H04W 74/0816; H04W 88/085
See application file for complete search history.

(56) References Cited

U.S. PATENT DOCUMENTS

| | | | |
|---|---|---|---|
| 10,986,660 B2 | 4/2021 | Chun | |
| 2003/0206543 A1 | 11/2003 | Fischer | |
| 2020/0374235 A1 | 11/2020 | Niu | |
| 2021/0044989 A1* | 2/2021 | Sekar | H04W 24/02 |
| 2021/0314954 A1* | 10/2021 | Miao | H04L 1/1896 |
| 2021/0378039 A1* | 12/2021 | Cherian | H04W 76/15 |
| 2021/0392673 A1* | 12/2021 | Miao | H04W 80/02 |
| 2021/0392714 A1* | 12/2021 | Han | H04W 36/0079 |
| 2021/0400584 A1* | 12/2021 | Miao | H04W 52/0235 |
| 2022/0022167 A1* | 1/2022 | Jha | H04W 72/02 |
| 2022/0038164 A1* | 2/2022 | Wei | H04W 88/14 |
| 2024/0063881 A1* | 2/2024 | Salem | H04B 7/0695 |

FOREIGN PATENT DOCUMENTS

| | | |
|---|---|---|
| EP | 3780792 A | 2/2021 |
| KR | 101992689 | 6/2019 |

* cited by examiner

Primary Examiner — Ajay Cattungal
(74) *Attorney, Agent, or Firm* — O'BANION & RITCHEY LLP; John P. O'Banion

(57) ABSTRACT

An enhanced protocol for addressing communication issues arising from using a Remote Radio Head (RRH). An Access Point (AP), denoted as Remote Radio Head (RRH) AP, consists of a Central Unit (CU) and at least one RRH that can be located remotely. The functionalities of the Medium Access Control (MAC) and the Physical (PHY) layers of the RRH AP are split between the CU and RRH; with the CU exchanging frames between the MAC layers, and the RRH transmitting and receiving the physical signals through the channel.

17 Claims, 34 Drawing Sheets

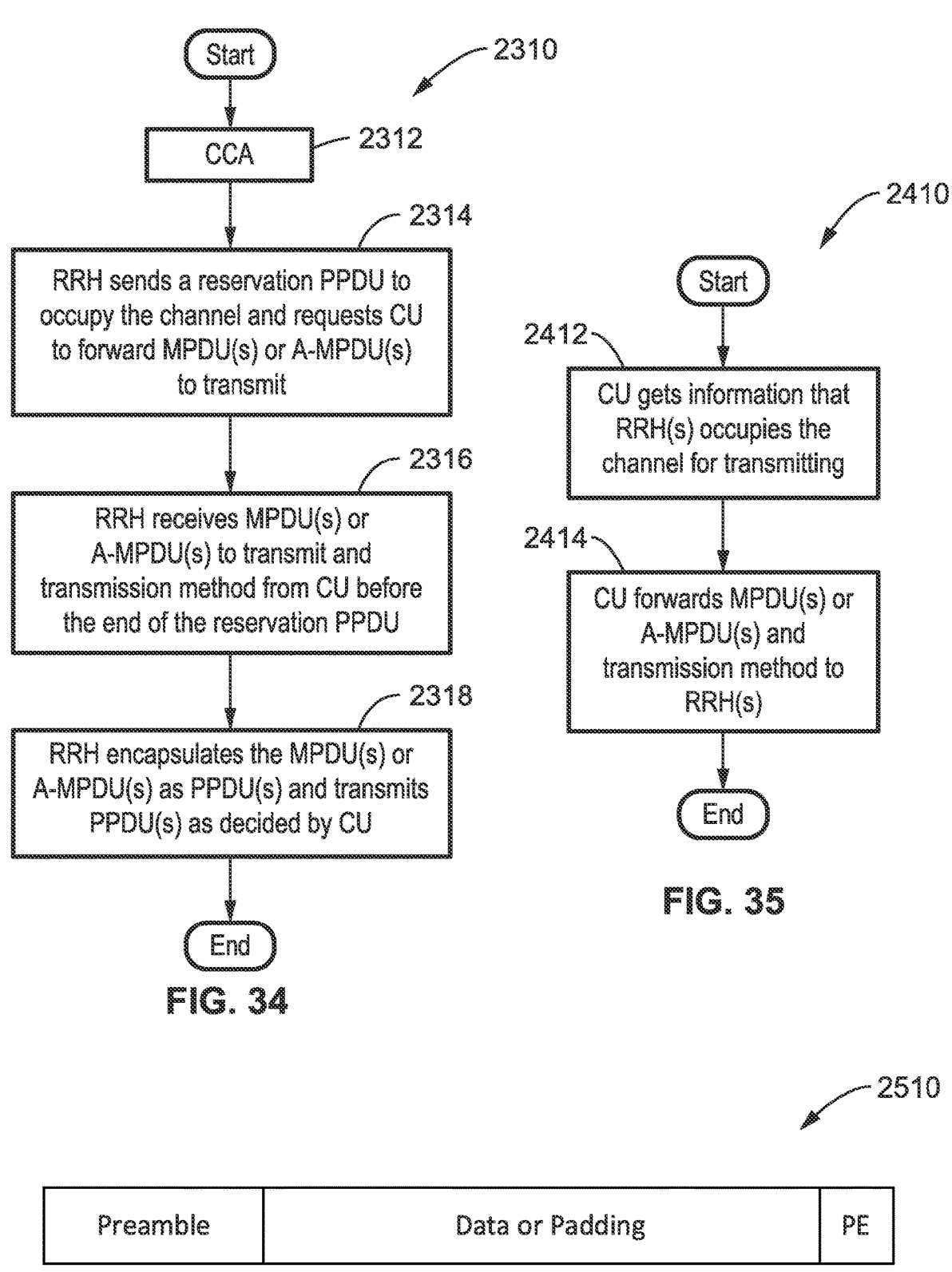

Start

CCA — 2312

2310

RRH sends a reservation PPDU to occupy the channel and requests CU to forward MPDU(s) or A-MPDU(s) to transmit — 2314

RRH receives MPDU(s) or A-MPDU(s) to transmit and transmission method from CU before the end of the reservation PPDU — 2316

RRH encapsulates the MPDU(s) or A-MPDU(s) as PPDU(s) and transmits PPDU(s) as decided by CU — 2318

End

Start

CU gets information that RRH(s) occupies the channel for transmitting — 2412

CU forwards MPDU(s) or A-MPDU(s) and transmission method to RRH(s) — 2414

End

| Preamble | Data or Padding | PE |
|----------|-----------------|----|

| ... | RRH Support | STA ID | RTT | PE duration | Identical response | ... |

TRANSMITTING AND RECEIVING VIA REMOTE RADIO HEAD

CROSS-REFERENCE TO RELATED APPLICATIONS

This application claims priority to, and the benefit of, U.S. provisional patent application Ser. No. 63/366,055 filed on Jun. 8, 2022, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

BACKGROUND

1. Technical Field

The technology of this disclosure pertains generally to wireless communications when using a Remote Radio Head (RRH), and more particularly to an enhanced protocol for addressing associated communication issues.

2. Background Discussion

Current technologies do not consider the function split of the Medium Access Control (MAC) and the Physical (PHY) layers across two separate devices. As a result, many communication issues arise in regard to the delays associated with this function split when transmitting and receiving via remote radio heads.

Accordingly, a need exists for an apparatus and protocol which overcomes these communication issues. The present disclosure fulfills that need and provides additional benefits over existing systems.

BRIEF SUMMARY

An apparatus and method is described for performing transmission of frames, either MAC Protocol Data unit (MPDU) or Aggregated-MPDU (A-MPDU) between the MAC layers of the IEEE 802.11 network, wherein frames are encapsulated as Physical Layer Protocol Data Unit (PPDUs) and the PHY layer of the IEEE 802.11 network transmits and receives the physical signal of the PPDU through the channel with Carrier Sense Multiple Access/Collision Avoidance (CSMA/CA) is used for channel contention which follows the Distributed Coordination Function (DCF) or the Enhanced DCA (EDCA) mechanism for timing relationship of the IEEE 802.11 network.

This disclosure describes use of an Access Point (AP), denoted as Remote Radio Head (RRH) AP, which consists of a Central Unit (CU) and at least one RRH. One of more of the RRH are located at different geographic locations. The functionalities of the MAC and PHY layer of the RRH AP is split between the CU and RRH. The CU performs exchanging frames between the MAC layers; and the RRH transmits and receives the physical signal through the channel.

There are numerous modes and variations of the present disclosure, a few of which include the following. When the RRH AP is transmitting to a STA, the CU forwards the frames to the RRH; and the RRH encapsulates the frames to PPDUs and transmits the PPDUs through the channel. When an RRH AP is receiving from a STA, the RRH receives a PPDU from the channel; and decodes the PPDU and forwards the frames in the PPDU to the CU. When an RRH obtaining a TXOP can generate and transmit a reservation PPDU to occupy the channel until it obtains the frames from the CU to transmit during the reservation PPDU. When multiple RRHs obtain a TXOP at the same time they can transmit reservation PPDUs to occupy the channel and await a decision from the CU on how to transmit PPDUs through those RRHs. When an RRH receiving a PPDU from a STA can start to forward the frames in the PPDU when receiving the PPDU signal and await the decision from CU on whether the RRH continues receiving. When an RRH is receiving a PPDU from a STA it can begin to forward the frames in the PPDU when receiving the PPDU signal and await a decision from CU of whether the RRH should transmits an immediate response for the PPDU. When an RRH is receiving a PPDU from a STA it can decode the frames in the PPDU and generate an immediate response to send within a SIFS time. When an RRH is receiving a PPDU with a Packet Extension (PE) that is longer than the round-trip time (RTT) between CU and RRH, it can forward the frames in the PPDU to the CU and wait for response frames from the CU in response to the PPDU. When multiple RRHs are receiving a PPDU with packet extension (PE) that is longer than the round-trip time (RTT) between CU and RRH, then the frames can be forwarded in PPDUs to the CU and wait for the response frames from the CU in response to the PPDU. In at least one embodiment/mode/option, a defined RRH AP can be used as a non-AP STA.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only:

FIG. 34 is a flow diagram of a RRH transmitting a PPDU according to at least one embodiment of the present disclosure.

FIG. 35 is a flow diagram of a CU transmitting MPDU or A-MPDU according to at least one embodiment of the present disclosure.

FIG. 36 is a data field diagram of a reservation PPDU format according to at least one embodiment of the present disclosure.

DETAILED DESCRIPTION

1. Introduction

Figure 1:
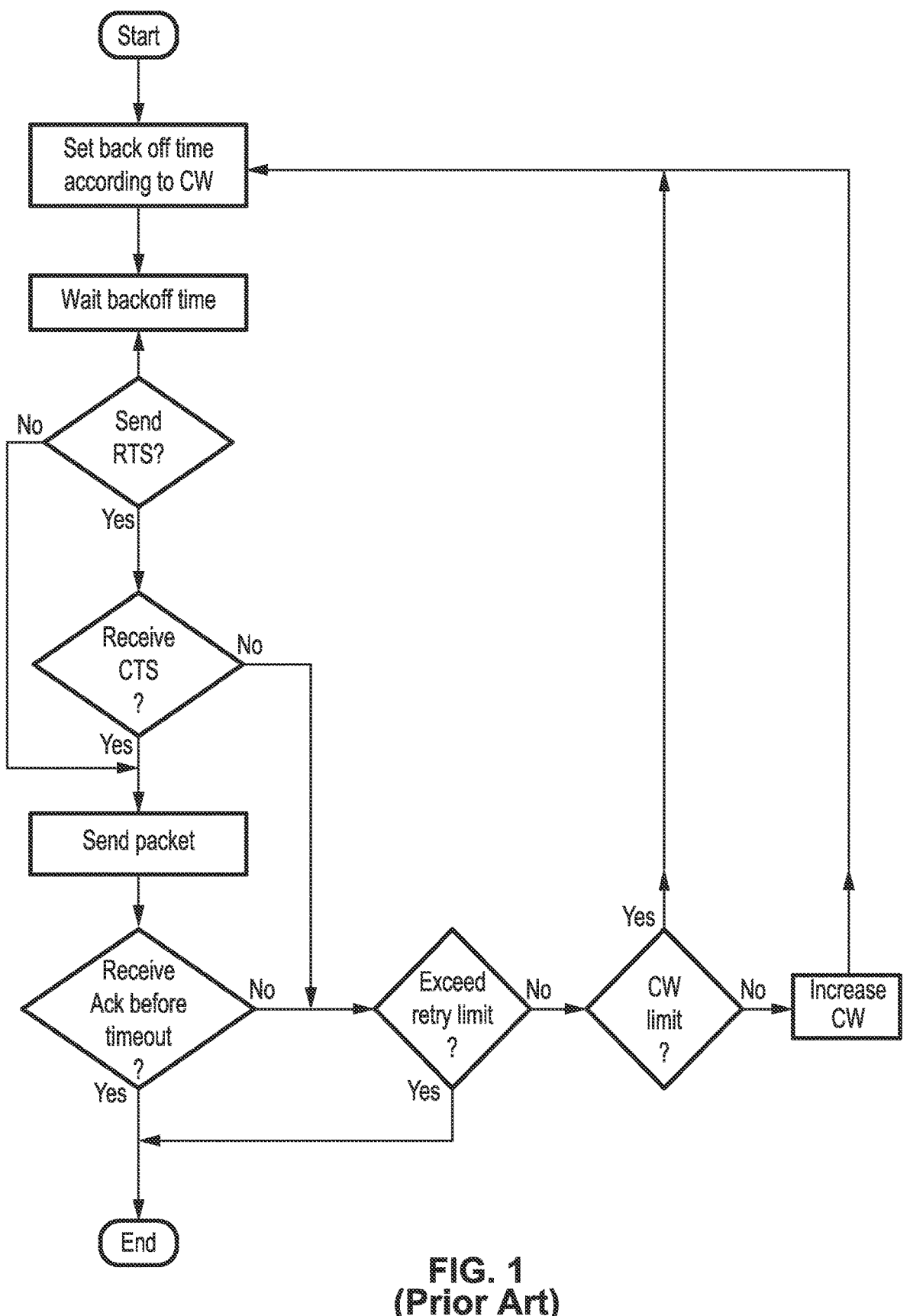
FIG. 1 is a flow diagram of using Carrier Sense Multiple Access/Collision Avoidance (CSMA/CA) to allow stations (STAs) to have random access to the channel for packet transmission and retransmission.

Currently, in IEEE 802.11 protocol development, Medium Access Control (MAC) layer functionalities are advancing more rapidly than that of the Physical (PHY) layer. In most cases, the development of the functionalities of the MAC layer is orthogonal to the PHY layer. That is, the new functionalities of the MAC layer do not require any development at the PHY layer. For example, when Restricted Target Wake Time (R-TWT) enhancement is added to the MAC layer of IEEE 802.11 be, it can be operated with the PHY layer of IEEE 802.11ax. This allows for the functionalities of the MAC and PHY layers to be implemented on the two devices and maintained separately. While the functionalities of the MAC layer are updated on one device, the functionalities of the PHY layer thus remain the same.

Open Systems Interconnection (OSI) is a conceptual model defined by International Organization for Standardization (IOS) to establish telecommunication between various computing systems with standard communication protocols. Typically, OSI consists of seven layers, application (APP) layer, presentation layer, session layer, transport layer, network layer, data link layer (MAC), and physical layer (PHY). Those layers are used to define and standardize the functions of telecommunication. When two systems share the same communication protocol at the same layers, they are able to exchange information between each other.

When communication occurs, each layer provides service to the layer above it and requests service from the layer below it. Therefore, the interworking communication between the layers in the OSI model is necessary to enable communication services.

IEEE 802.11 protocols define the standard communication protocols at the data link (i.e., MAC) and physical (i.e., PHY) layers. The functionalities of the MAC and the PHY layers are implemented in the same IEEE 802.11 device so the interworking communication between the MAC and the PHY layers are fast. The processing time of the interworking communication is short compared with the Distributed Coordination Function (DCF) timing requirement of IEEE 802.11.

However, when the functionalities of the MAC and the PHY are implemented on two devices, the interworking communication between the MAC and the PHY (or between two devices) takes significantly longer time, which may violate the DCF timing requirement of IEEE 802.11. For example, a Short Interframe Space (SIFS) time is 16 μs in which an IEEE 802.11 device is required to respond to a frame that it has received. Yet, the most rapid requirement of time-sensitive networking (TSN) of one-way communication is 25 μs. However, the round-trip time (RTT) between the MAC layer on one device and the PHY layer on the other device is 50 μs. Accordingly, the system can only guarantee responding to a frame within 50 μs, which is longer than a SIFS time.

This situation becomes even more challenging when the legacy IEEE 802.11 STAs do not recognize that the MAC layer and the PHY layer are implemented at two different devices of its peer STA. The legacy IEEE 802.11 STAs do not know (recognize) the extra interworking communication time required between the MAC and the PHY layers of its peer STA; thus, it will not provide extra processing time, such as by adding a Packet Extension (PE) field in its Physical layer Protocol Data Unit (PPDU) when it transmits, whereby it will still expect to receive a response within a SIFS time.

Furthermore, when one device having a MAC layer implemented as connected to multiple devices with a PHY layer implemented; then those devices with PHY layer implemented may receive a PPDU from a legacy IEEE 802.11 STA at the same time. However, only one of them should respond to the PPDU within a SIFS time to avoid the collision. Due to the extra interworking communication time between the MAC and the PHY layers, there is insufficient time for them to communicate with the device with MAC layer implemented to make a decision within a SIFS time.

The current technologies do not consider the function split of the MAC and the PHY layers of IEEE 802.11 in two separate devices. The challenge is to decide which functionalities of the MAC layer and the PHY layer should be implemented on one device while the remainder of the functionalities are implemented on the other device in order to make the function split compatible with the current IEEE 802.11 protocol.

1.1. Current CSMA/CA System Operation

In WLAN systems, IEEE 802.11 uses Carrier Sense Multiple Access/Collision Avoidance (CSMA/CA) to allow stations (STAs) to have random access to the channel for packet transmission and retransmission.

FIG. 1 depicts general operation of CSMA/CA. In a CSMA/CA system, the STA senses channel transmission activity when there is data to transmit. Before each transmission and retransmission, the STA must sense the channel and set a backoff time to contend for channel access. The backoff time is decided by a uniform random variable between zero and the size of a Contention Window (CW).

After the STA waits in this backoff time, is performs sensing that the channel is idle. If it was idle during the backoff, then the STA decides whether to send a Ready-To- Send (RTS) frame to ensure channel occupancy or not. If the STA sends an RTS frame, then channel occupancy is ensured when it receives a Clear-To-Send (CTS) frame. The STA then sends the packet. If the STA does not send an RTS frame, it sends the packet directly.

A retransmission is required if the CTS frame is not received after sending RTS frame, or the STA does not receive an Ack prior to a communication timeout. Otherwise, the transmission succeeds.

When retransmission is required, the STA checks the number of retransmissions of the packet. If the number of retransmissions exceeds the retry limit, then the packet is dropped, and no retransmission is scheduled. Otherwise, the retransmission is scheduled.

If the retransmission is scheduled, then another backoff time is necessary to contend for channel access for retransmission. If the size of the contention window has not already reached the upper limit, then the STA increases it. The STA sets another backoff time depending on the new size of the contention window. The STA waits the backoff time for retransmission and the process repeats.

Figure 2:
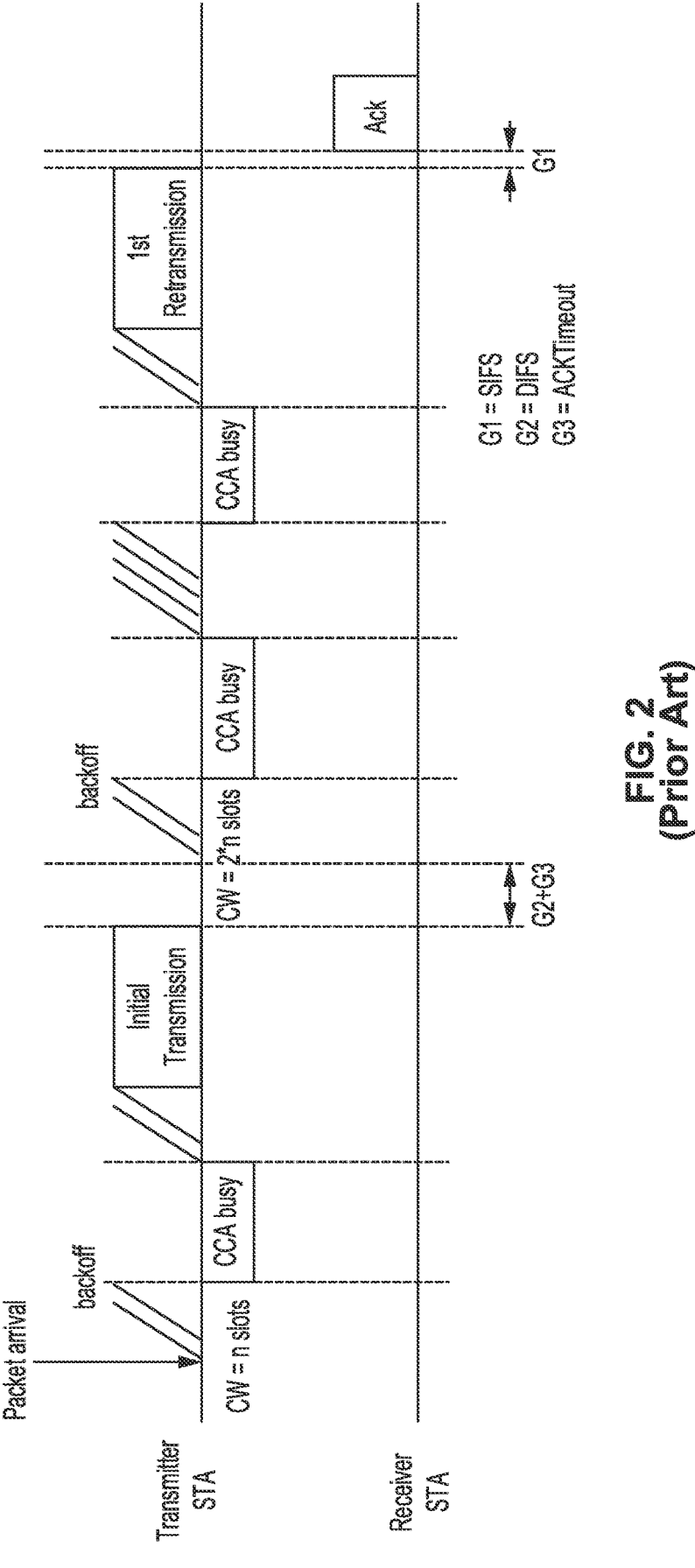
FIG. 2 is a communications diagram of random channel access in CSMA/CA in which RTS/CTS is disabled.

FIG. 2 illustrates one example of the random channel access in CSMA/CA in which RTS/CTS is disabled. When the MAC layer of the transmitter STA receives the data from its upper layers, it contends for the channel to gain channel access. When the transmitter STA contends for the channel, it has to wait until the end of the backoff time to access the channel, so if the size of the contention window is n slots, then these slots must be counted down to zero. The countdown process will be interrupted (i.e., CCA busy) when another packet transmission occurs over the channel. After the transmitter STA gains channel access to transmit the data, it packetizes the data into a packet(s) and transmits the packet(s) over the channel. As shown in the figure, if the initial transmission of the packet fails, a retransmission of the packet is needed. The transmitter STA sets a backoff time again to contend for channel access. This time, the size of the contention window is doubled, so it is then 2*n slots, due to the retransmission. The expected backoff time is also doubled by the contention window size. When the backoff time is longer, there is a higher probability that the countdown process will be interrupted (i.e., CCA busy) by another packet transmission.

2. Problem Statement

Current technologies do not consider the function split of the MAC and the PHY layers of IEEE 802.11 in two separate devices. When the functionalities of the MAC and the PHY are implemented on two different devices, the interworking communication between the MAC and the PHY (or between two devices) takes significantly longer, which may violate the DCF timing requirement of IEEE 802.11. In the scenarios outlined below, when transmitting and receiving through the devices using the function split, there is often not sufficient time for the communication between the two devices.

When such a device with PHY layer implemented obtains the TXOP, it only has aRxTxTurnaroundTime (4 μs in IEEE 802.11) to decide what and how to transmit the PPDU.

When such a device with PHY layer implemented receives a PPDU from a legacy STA, it is required to respond within aSIFSTime (16 μs in IEEE 802.11).

When one device with MAC layer implemented is connected to multiple devices with PHY layer implemented, those devices with PHY layer implemented may receive a PPDU at the same time. Only one of them should respond within aSIFSTime to avoid the collision.

3. Contribution of the Invention

By utilizing the disclosed technologies, the functionalities of the MAC and the PHY layers of IEEE 802.11 are split and implemented on two devices, denoted as Central Unit (CU) and Remote Radio Head (RRH). The CU performs transmission of frames (MPDUs or A-MPDUs) between the MAC layers. RRH station units performs transmission of PPDUs between the MAC layers, as well as transmitting and receiving the physical signal through the channel. An AP, denoted as RRH AP, consists of a central unit (CU) and at least one remote radio head (RRH), wherein the CU and one or more RRH units are at different physical (geographic) locations.

By utilizing the disclosed technologies, an RRH AP is able to meet the DCF timing requirement of IEEE 802.11 when it transmits. When an RRH AP gains channel access, it begins transmitting within a RxTxTurnaroundTime to occupy the channel.

By utilizing the disclosed technologies, an RRH AP is able to communicate with the legacy IEEE 802.11 STAs which do not recognize the function split of RRH AP. When the function split of RRH AP receives a PPDU from a legacy STA, it responds within aSIFSTime. This requires partial functionalities of the MAC layer to be implemented at the RRH.

By utilizing the disclosed technologies, a STA supporting the RRH AP is aware of the extra processing time due to the communication between RRH and CU. When such a STA transmits a PPDU, it adds extra PE field in its PPDU so that the RRH AP has enough time to process it between the RRH and CU.

By utilizing the disclosed technologies, the function split between MAC layer and PHY layer is different depending on the backward compatibility. For example, if an RRH AP communicates with a legacy STA, some functionalities of the data plane at the MAC layer are implemented at RRH in order to make RRH able to respond within aSIFSTime. Otherwise, all the functionalities of the data plane at the MAC layer can be implemented at the CU.

4. Embodiments 4.1. Remote Radio Head (RRH) Station Hardware

Figure 3:
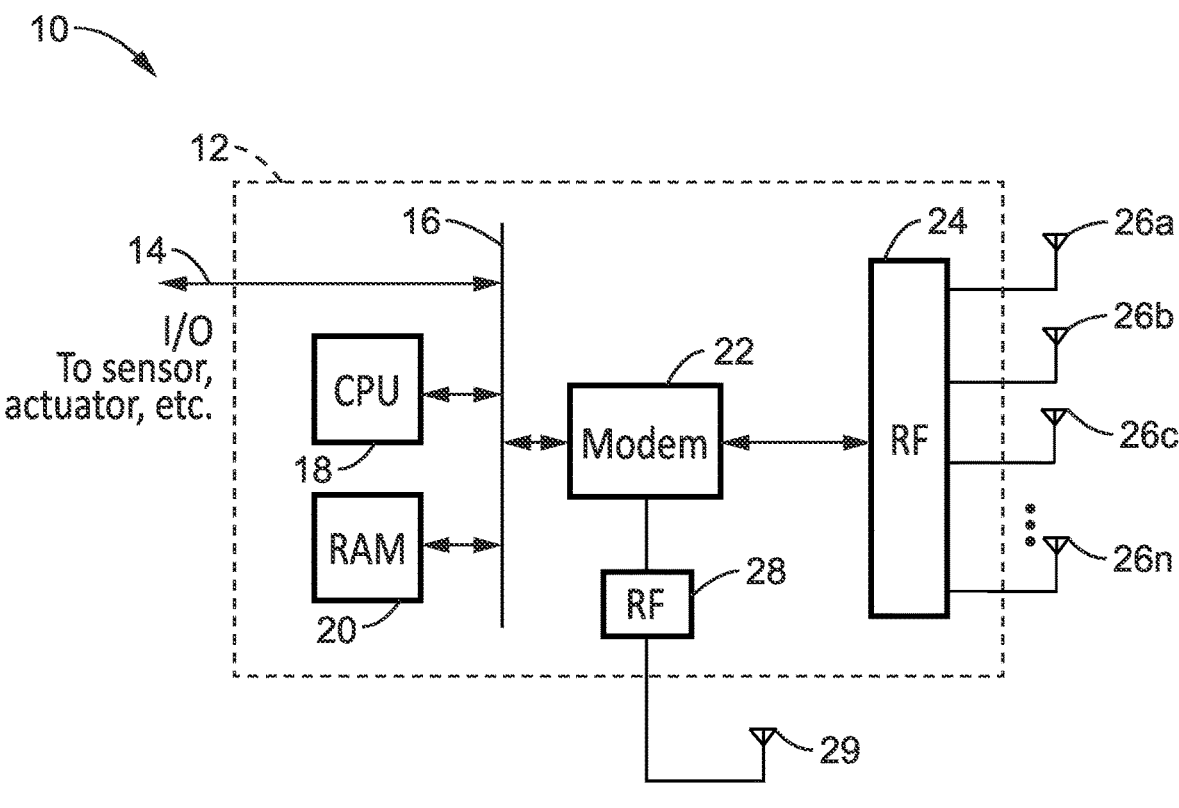
FIG. 3 is a block diagram of a communications Remote Radio Head (RRH) Station (STA) hardware according to at least one embodiment of the present disclosure.

FIG. 3 illustrates an example embodiment 10 of Remote Radio Head (RRH) Station (STA) hardware configured for executing the protocol of the present disclosure.

An external I/O connection 14 preferably couples to an internal bus 16 of circuitry 12 upon which are connected a CPU 18 and memory (e.g., RAM) 20 for executing a program(s) which implements the described communication protocol. The host machine accommodates at least one modem 22 to support communications coupled to at least one RF module 24, 28 each connected to one or multiple antennas 29, 26a, 26b, 26c through 26n. An RF module with multiple antennas (e.g., antenna array) allows for performing beamforming during transmission and reception. In this way, the RRH can transmit signals using multiple sets of beam patterns.

Bus 14 allows connecting various devices to the CPU, such as to sensors, actuators, a CU, and so forth. Instructions from memory 20 are executed on processor 18 to execute a program which implements the communications protocol.

Thus, the RRH HW is shown configured with at least one modem, and associated RF circuitry for providing communication on at least one band. It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the RRH determines it is unnecessary to communicate with neighboring RRHs. In at least one embodiment, the RF circuitry includes frequency converter, array antenna controller, and so forth, and is connected to multiple antennas which are controlled to perform beamforming for transmission and reception. In this way the RRH can transmit signals using multiple sets of beam patterns, each beam pattern direction being considered as an antenna sector.

Figure 4:
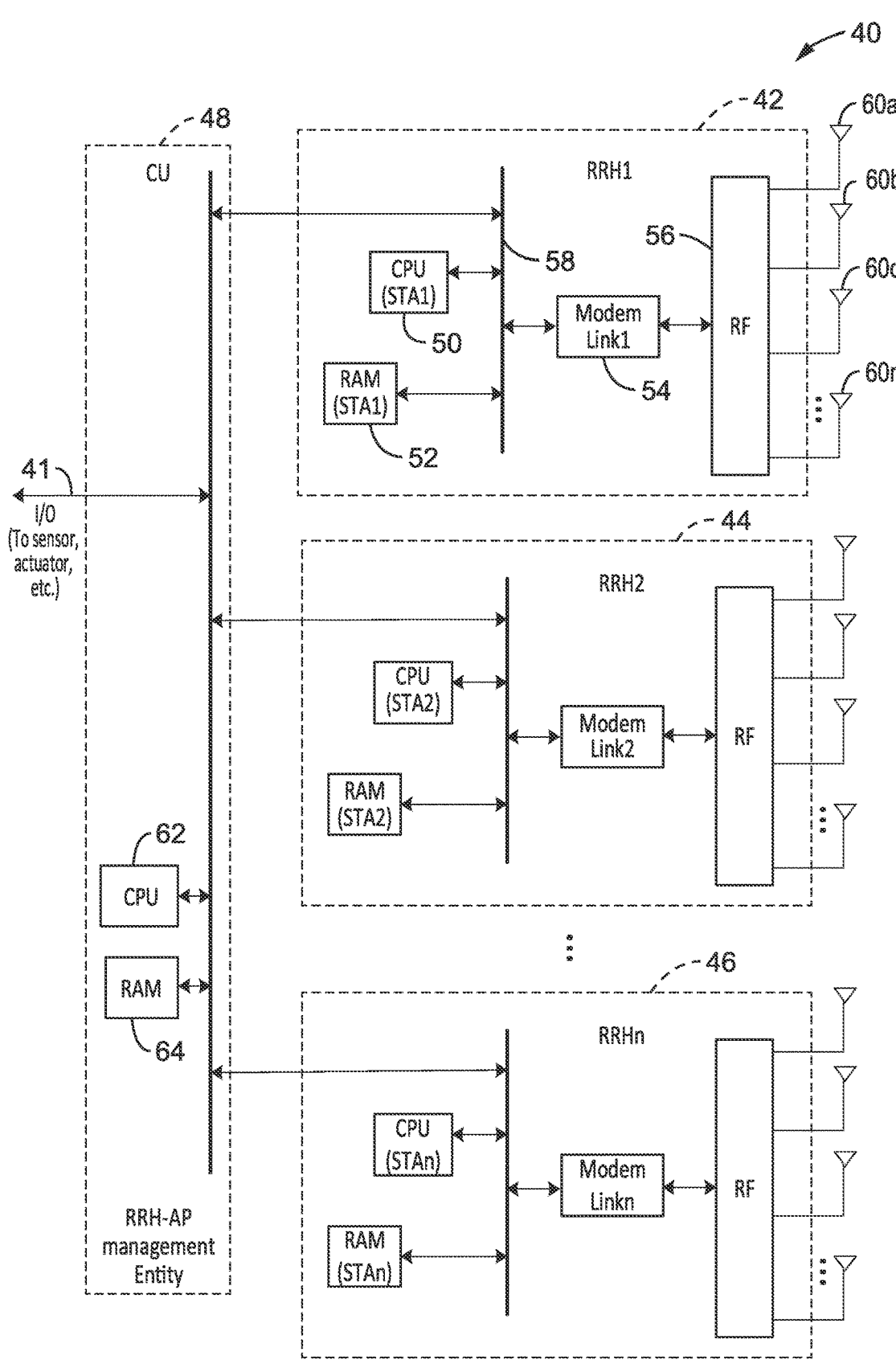
FIG. 4 is a block diagram of an RRH AP consisting of one CU and at least one RRH according to at least one embodiment of the present disclosure.

FIG. 4 illustrates an example embodiment 40 of a RRH AP consisting of one CU and at least one RRH. As shown in the figure, multiple RRHs are affiliated with a CU. CU and RRHs are at different geographical locations.

CU has external I/O to access applications of CU, CPU and RAM of CU, to run a program that implements communication protocols at MAC layer. It could distribute tasks to and collect information from each affiliated RRH and share information between affiliated RRHs.

It should be noted that the RRHs associate with one CU, and may operate on the same link, so there is no need to distribute the RRHs to different Modem Links.

RRH has I/O to access applications, and a CPU and RAM to run a program that implements communication protocols at the PHY layer. The CU of the RRH accommodates a Modem which transmit/receives PPDUs with neighboring RRHs. A modem is connected to the RF module to generate and receive physical signals. The RF module, by way of example includes frequency converter, array antenna controller, and so forth. The RF module is connected to multiple antennas which are controlled to perform beamforming for transmission and reception. In this way, the RRH can transmit signals using multiple sets of beam patterns.

It should be noted that the per-RRH CPU and per-RRH RAM can be optional depending on the implementation.

It should be noted that if RRH is compatible with the legacy STAs, RRH should also run a program that implements partial communication protocols at the MAC layer in order to send a response frame within aSIFSTime. Examples are shown in FIG. 23-25 and FIG. 26-28. Then, the CU should have access to that program through using external I/O.

In particular, the CU with one or more RRHs, with each RRH operating on a link of a different frequency. Each RRH has external I/O access, which is shown connecting to a CU 48 having a CPU 62 and memory (e.g., RAM) 64 to allow executing a program(s) that implements communication protocols at the CU level. The CU can distribute tasks to, and collect information from, each affiliated station to which it is connected, exemplified here as RRH1 42, RRH2 44 through to RRHn 46 and the sharing of information between affiliated RRHs.

In at least one embodiment, each RRH of the RRH AP has its own CPU 50 and memory (RAM) 52, which are coupled through a bus 58 to at least one modem 54 which is connected to at least one RF circuit 56 which has one or more antennas. In the present example the RF circuit has multiple antennas 60a, 60b, 60c through 60n, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each RRH of the depicted RRH AP does not necessarily require its own processor and memory, as the RRHs may share resources with one another and/or with the RRH AP management entity, depending on the specific RRH AP implementation. It should be appreciated that the above RRH AP diagram is given by way of example and not limitation, whereas the present disclosure can operate with a wide range of RRH AP implementations.

4.2. Example Topology

Figure 5:
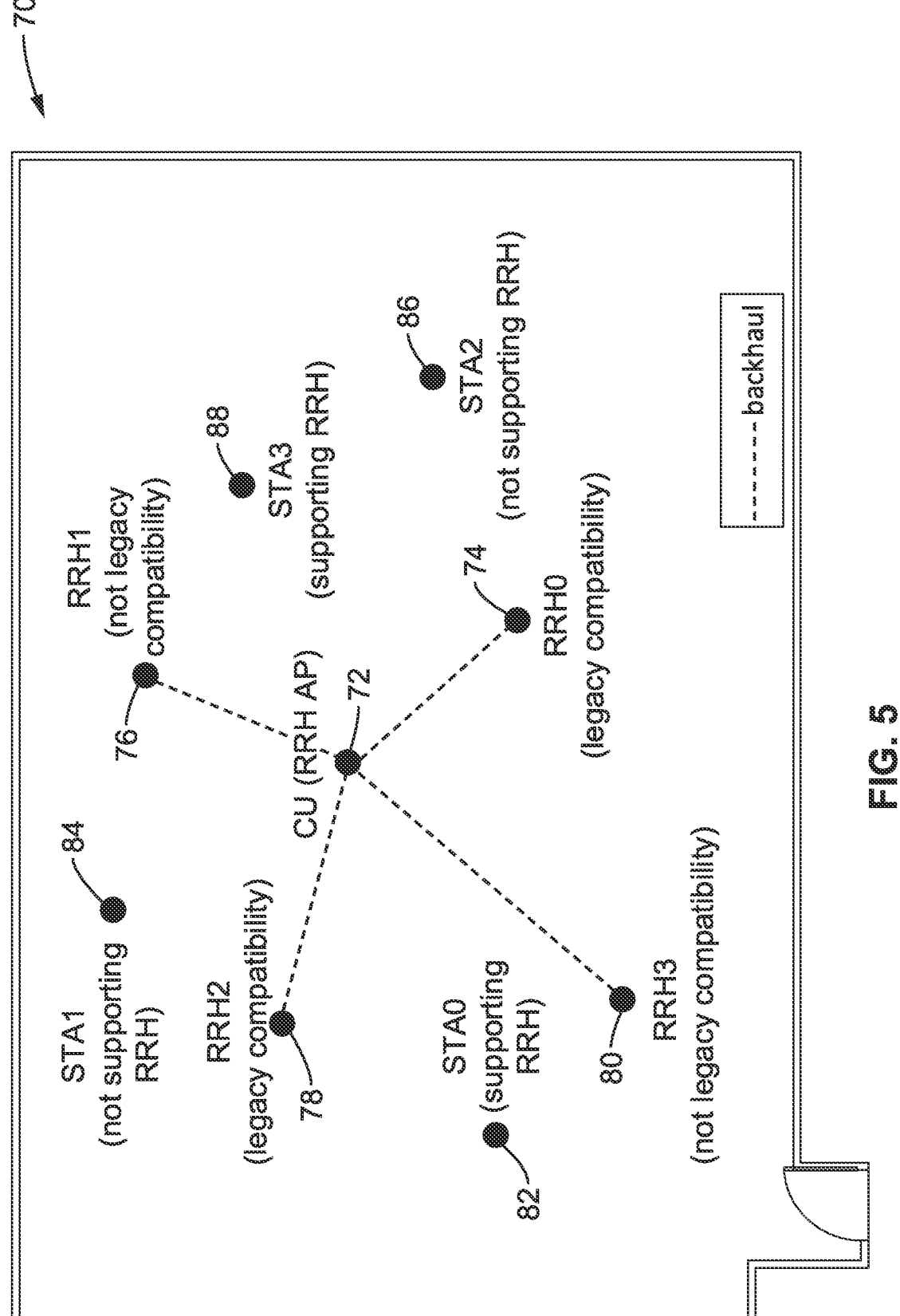
FIG. 5 is a network topology diagram utilized according to at least one embodiment of the present disclosure.

FIG. 5 illustrates an example network topology 70 to better explain the goal of the disclosed technology. The figure is provided to aid in the discussions of the techniques involved towards engendering an improved understanding of the disclosed technology. It should be appreciated that the present disclosure is in no way limited to the topology of this example, as the protocol may be utilized on communications between networks containing CU RRHs having any desired topology.

In this example, it is assumed there is a single RRH AP consisting of one CU 72 and four RRHs comprising RRH0 74 which is legacy compatible, RRH1 76 which is not legacy compatible, RRH2 78 which is legacy compatible, and RRH3 80 which is not legacy compatible. The CU and RRHs are, by way of example and not limitation, depicted in an area shown as a meeting room. There are also other STAs shown in this area, depicted as STA0 82 which supports RRH, STA1 84 which does not support RRH, STA2 86 which does not support RRH, and STA3 88 which supports RRH.

The CU and each RRH are connected through a backhaul link for each RRH at a different location. This backhaul has an associated processing time in which the CU and RRH exchange information between each other. The processing time for the CU sending a message to RRH and receiving feedback (or in the reverse direction) is denoted as Round-Trip Time (RTT).

In the figure, the STAs are regular IEEE 802.11 devices, which do not have a function split between CU and RRH. However, in at least one embodiment/mode/option the function split between CU and RRH can also apply to a non-AP STA.

There are two types of STAs as shown in the figure. STAs not supporting RRH may be legacy STAs that do not recognize the existence of the RRH AP. They can only regard the RRH AP as a regular AP of IEEE 802.11 with no function split between CU and RRH. STAs supporting RRH recognize the existence of the RRH AP and are aware (e.g., have information on) the round-trip time (RTT) of the communication between CU and RRH.

There are two types of RRHs depicted in the figure. The RRH that is legacy compatibility, is a type of RRH that is able to transmit and receive PPDUs with STAs not supporting RRH (legacy STA) and STAs supporting RRH.

The RRH that is not legacy compatibility is a type of RRH that can transmit and receive PPDUs with STAs supporting RRH. Such RRH may be able to transmit PPDUs to STAs not supporting RRH. Such RRH devices may be able to receive PPDU from STAs not supporting RRH if the PPDU does not require immediate response within a SIFS time.

However, such RRH cannot send an immediate response within a SIFS time to a PPDU from a STA not supporting RRH.

All STAs use CSMA/CA for random channel access. When a STA gains channel access, it starts to transmit PPDUs to RRH and waits for an immediate response from the RRH if needed.

When RRH receives a PPDU, it forwards the frames in the PPDU to the CU. Each RRH performs a Clear Channel Assessment (CCA) and uses CSMA/CA for random channel access. When one or more RRHs obtains (gains) channel access, it starts to transmit PPDUs carrying the frames received from the CU.

For an RRH AP, the CU has a MAC identity (i.e., MAC address) that is shared with all its affiliated RRHs. STAs use this MAC address to associate and exchange frames with the RRH AP.

An RRH is able to generate and decode some control frames, such as Multi-User (MU-)RTS, CTS, Ack frame, at the MAC layer. If an RRH is legacy compatibility, then it is also able to generate and decode Block Acknowledgement (BA) frames.

In at least one embodiment/mode/option each RRH maintains a local Timing synchronization function (TSF) time. All the RRHs affiliated with the same CU share the same TSF time with the CU, or The TSF time on each RRH is different but the offset of the TSF times between two RRHs is known (recognized) by each other.

4.3 Downlink Transmission

This section describes how an RRH launches a DownLink (DL) transmission with a STA. The network topology is as shown in FIG. 5. The MAC data plane architecture between CU and RRH is shown as in Section 4.5, which can be configured for being legacy compatible and/or non-legacy compatible.

Figure 6:
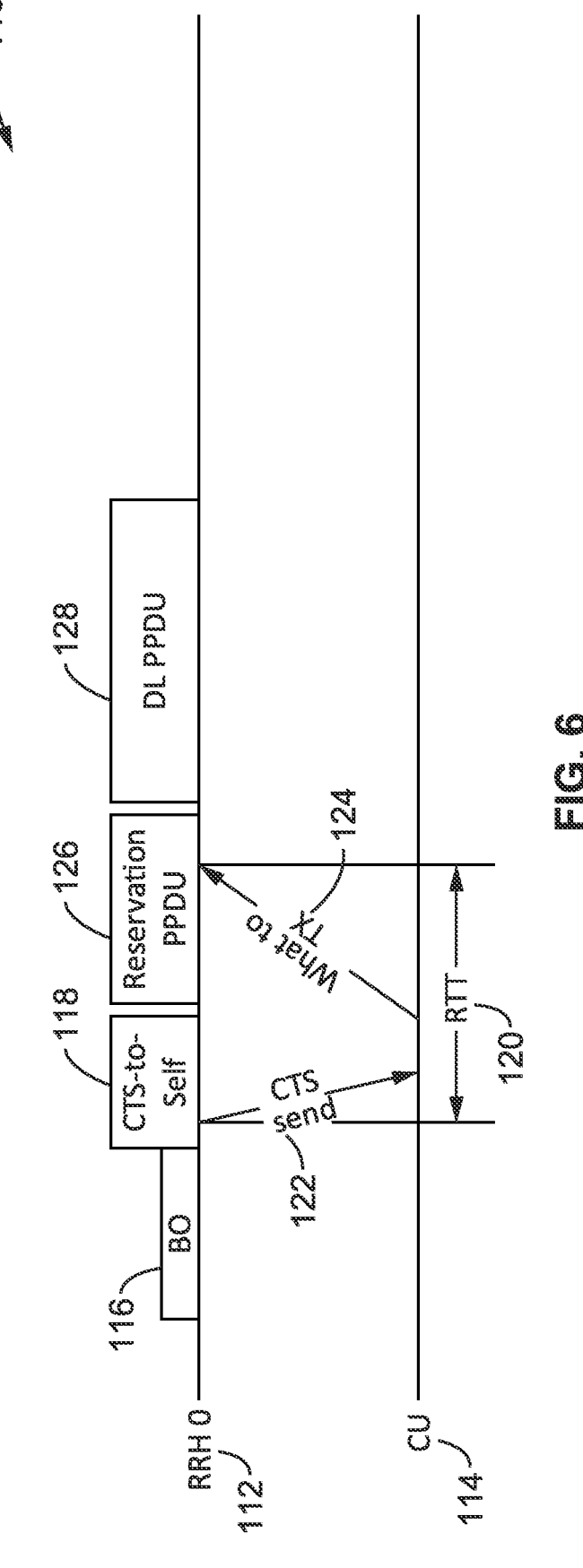
FIG. 6 is a communications diagram of an RRH obtaining a TXOP and starting a transmission according to at least one embodiment of the present disclosure.

FIG. 6 illustrates an example embodiment 110 of an RRH0 obtaining a TXOP and starting a transmission. In this case, the procedure is shown when the RRH0 112 transmits a CTS-to-Self frame to reserve a Transmit Opportunity (TXOP), but requires more than the CTS-to-self frame duration to communicate with the CU 114 for the next PPDU transmission. For example, the RRH0 112 may need to confirm with the CU 114 if it is coordinating with other RRHs.

As shown in the figure, when RRH0 obtains the TXOP after counting down backoff 116, it transmits a frame 118, such as CTS-to-Self frame, to occupy the channel. Meanwhile, RRH0 informs 114 the CU that it has obtained the TXOP and checks with the CU on what it is to transmit during the TXOP. As shown in the figure, the duration of the CTS-to-self frame 118 is shorter than the RTT 120 between RRH0 and CU. RRH0 then transmits a reservation PPDU 126 to keep occupying the channel and waits feedback 124 from the CU. Before the end of reservation PPDU, RRH0 should receive the feedback 124 from the CU which directs (tells) the RRH0 which frames to transmit. The CU may also direct (tell) the RRH0 how to transmit those frames (signal processing at PHY layer), such as which Modulation Coding Scheme (MCS) to use, whether to use beamforming or Multiple-Input Multiple-Output (MIMO). Then, RRH0 starts to transmit DL PPDU 128 as requested by the CU.

It should be noted that if the CTS-to-Self duration is longer than RTT, there is no need to transmit a reservation PPDU. In at least one embodiment/mode/option RRH0 uses other TXOP reservation methods, such as RTS/CTS, to obtain the TXOP. In at least one embodiment/mode/option RRH0 transmits a reservation PPDU instead of a CTS-to-Self frame.

It should be noted that if RRH0 has already determined (knows) what to transmit in the DL PPDU, when it finishes backoff procedure, it can transmit that DL PPDU immediately without transmitting a CTS-to-self frame or reservation PPDU.

The format of the depicted reservation PPDU is shown in FIG. 36. In at least one embodiment/mode/option the reservation PPDU carries a CTS-to-Self frame in its payload. Also, in at least one embodiment/mode/option the reservation PPDU is a Null data PPDU (NDP) or a PPDU carrying QoS Null frames.

It should be noted that RRH 0 can initiate an RTS/CTS frame exchange instead of transmitting a CTS-to-self frame; when the duration of the RTS/CTS frame exchange is sufficient to allow the RRH to communicate with the CU to decide what to transmit in the DL PPDU. It should be noted that in at least one embodiment/mode/option the CTS-to-self frame is optionally transmitted.

Figure 7:
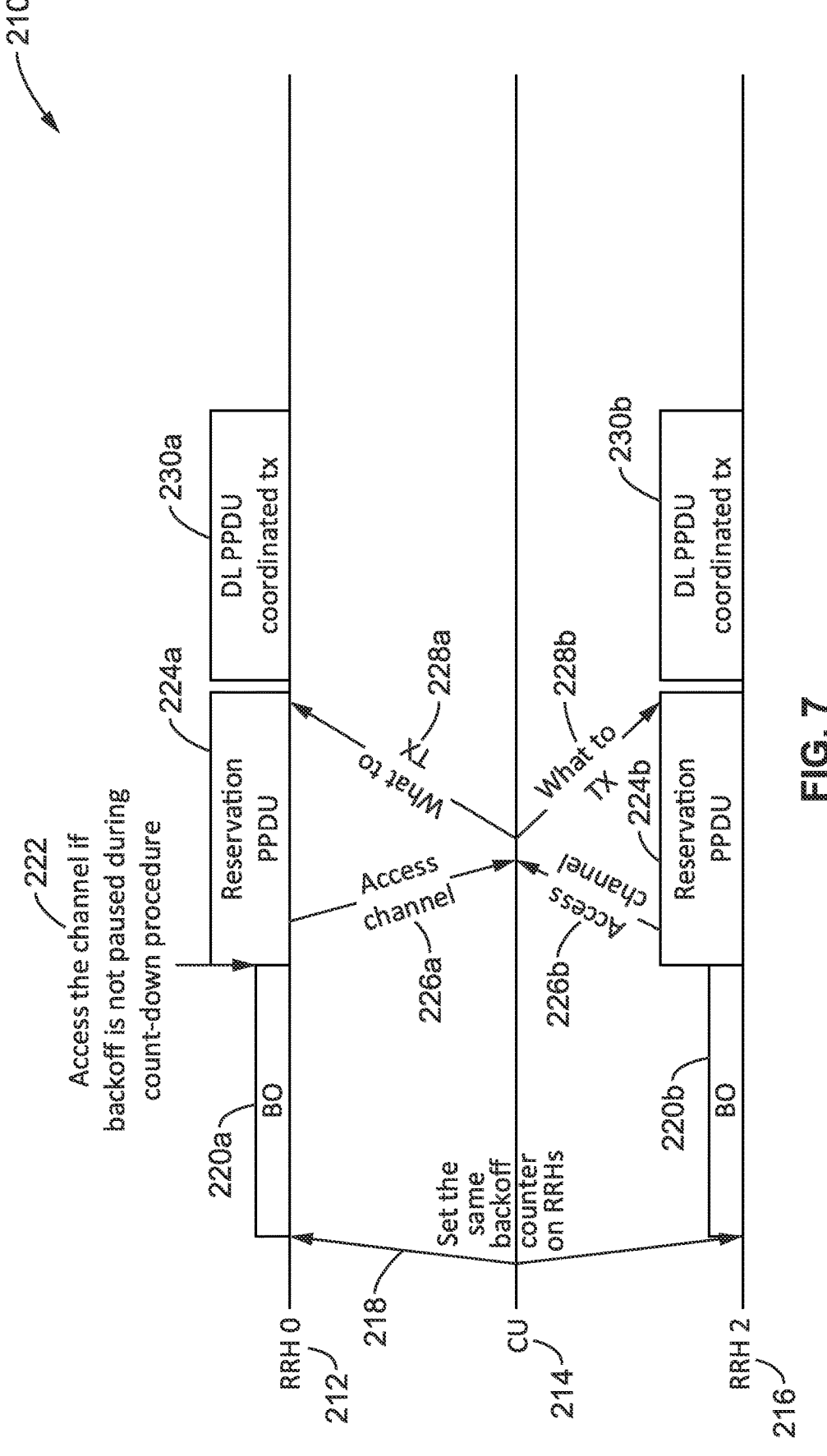
FIG. 7 is a communications diagram of multiple RRHs obtaining a TXOP and starting to transmit according to at least one embodiment of the present disclosure.

FIG. 7 illustrates an example embodiment 210 of multiple RRHs obtaining a TXOP and starting to transmit. The figure depicts the interactions between CU 214 and RRH0 212 and RRH2 216.

In this case, the CU has the same backoff count 220*a* and 220*b* set on both the RRHs. Then, each RRH counts down the backoff independently. If the backoff procedure at an RRH is not paused until its backoff counter reaches zero, then the RRHs both access 222 the channel at the same time. The RRHs transmit reservation PPDU 224*a* and 224*b* to occupy the channel. During the duration of reservation PPDU, RRH0 and RRH2 inform 226*a* and 226*b* the CU that they have accessed the channel, and the CU decides and communicates 228*a* and 228*b* to the RRHs what and how to transmit during the DL PPDU. Then, RRH0 and RRH2 transmit the DL PPDU 230*a* and 230*b* which can be a coordinated transmission.

It should be noted that the RRH pauses its backoff and reports its Network Allocation Vector (NAV) setting to the CU when it senses CCA busy.

In at least one embodiment/mode/option both RRH0 and RRH2 know (recognize) what and how to transmit the DL PPDU before accessing the channel. For example, the coordinated transmission of DL PPDU can be a coordinated Orthogonal Frequency-Division Multiple Access (OFDMA) transmission. RRH0 will transmit DL PPDU through Resource Unit 0 (RU0) and RRH2 will transmit DL PPDU through RU2. In such a case, RRH0 and RRH2 are not required to transmit a reservation PPDU, but instead they transmit the DL PPDU immediately once they can access the channel.

The reservation PPDU transmitted by RRH0 and RRH2 should be identical and contain the same scrambling seed. The scrambling seed can, by way of example and not limitation, be generated by the CU and shared between the RRHs.

Figure 8:
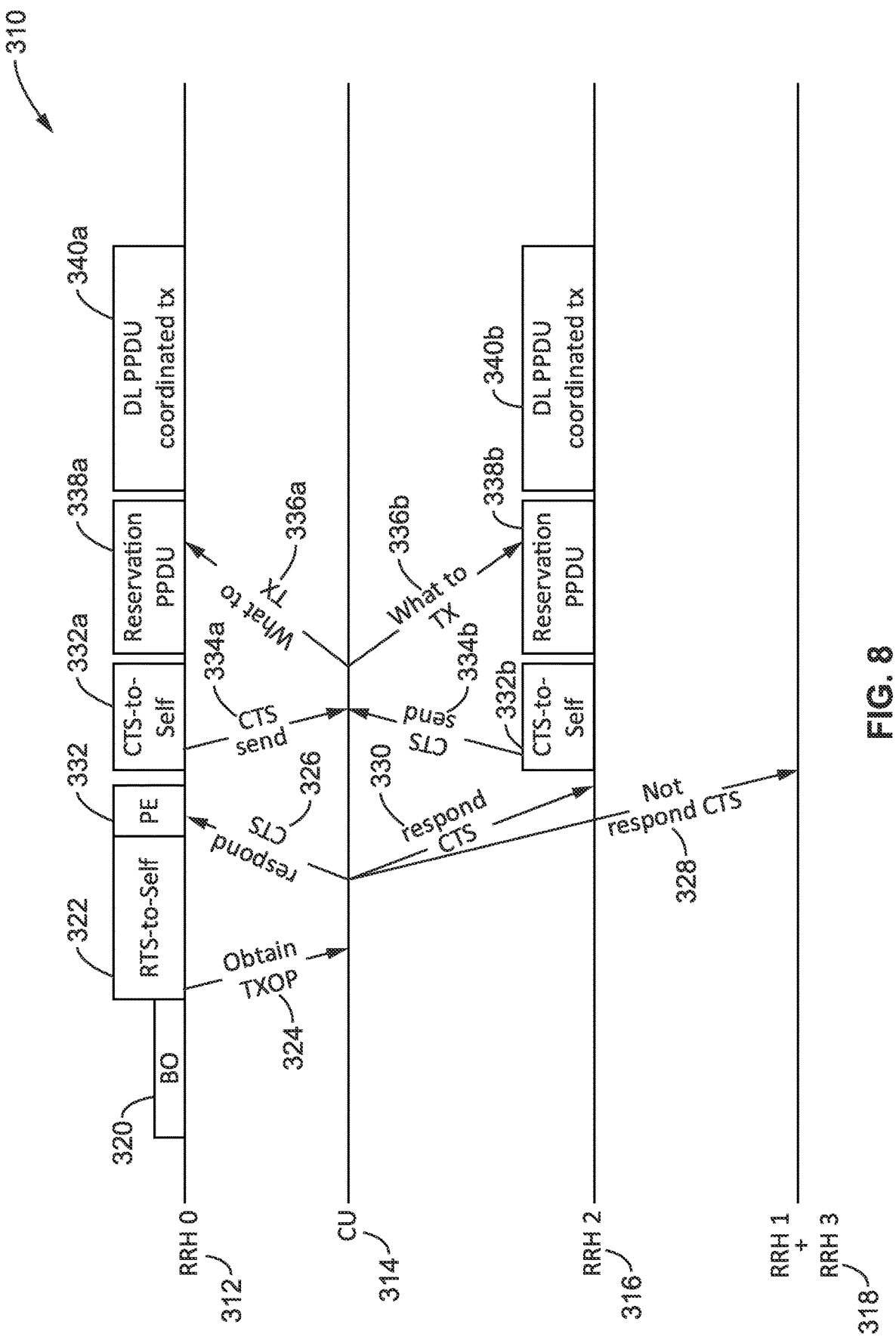
FIG. 8 is a communications diagram of coordinated transmission between multiple RRHs according to at least one embodiment of the present disclosure.

FIG. 8 illustrates an example embodiment 310 of coordinated transmission between multiple RRHs. The figure depicts interaction between CU 314 and RRH0 312, RRH2 316; while RRHs 318, comprising RRH1 and RRH 3 are not involved in the transmissions.

As shown in the figure, when one RRH obtains a TXOP, such as via using BO 320, it transmits an RTS-to-self frame 322 to the other RRHs. The RTS-to-self frame can be identical to the RTS or MU-RTS frame as defined in IEEE 802.11 be with the RA field of the frame set to the MAC address of the CU. As shown in the figure, the PPDU that carries RTS-to-self frame adds a Packet Extension (PE) field 332 to ensure that the duration of the PPDU carrying the RTS-to-self frame is of a longer duration than RTT. Then, during the duration of PPDU 322 carrying the RTS-to-self frame, RRH0 contacts the CU that it has obtained 324 the TXOP and the CU informs 326, 328 and 330 all its affiliated RRHs, as to whether they should send a CTS-to-self frame immediately after the PPDU carrying RTS-to-self frame is finished. As shown in the figure, the CU decides to let RRH0 and RRH2 to respond with a CTS-to-self frame, while RRH1 and RRH3 are not to respond with a CTS-to-self frame.

Then, RRH0 and RRH2 transmit CTS-to-self frame 332*a* and 332*b* to occupy the channel. When a RRH is transmitting CTS-to-self, it informs 334*a*, 334*b* the CU that it has transmitted CTS-to-self frame and it is available to transmit. Also, the RRH should request (ask) that the CU indicate what and how to transmit DL PPDUs. As mentioned in the previous example, the duration of CTS-to-self frame is not allowed to be shorter than RTT, in this example RRH0 and RRH2 transmit another reservation PPDU 338*a*, 338*b* to maintain channel occupancy (keep occupying the channel) and waiting for feedback from the CU. Before the end of the reservation PPDU, the CU informs (tells) 336*a* and 336*b* these RRH what to transmit in the DL PPDU and how to transmit the DL PPDU. Then each RRH transmit DL PPDUs 340*a* and 340*b* according to the CU.

The RRT between CU and each RRH can be configured in a different manner. The duration of the PPDU carrying RTS-to-self frame should be longer than the maximum RTT of all the RRHs or at least longer than the one-way time (half of RTT) of RRH0 plus the maximum one-way time of all the RRHs.

RRH0 and RRH2 should perform a CCA before transmitting a CTS-to-self frame. If the RRH detects CCA busy, then it does not transmit a CTS-to-self frame. In at least one embodiment/mode/option RRH2 does not transmit a CTS-to-self frame if it does not receive an RTS-to-self frame from RRH0 over the air or it has NAV settings which are not equal to zero. If a RRH does not transmit a CTS-to-self frame, then it is not available to transmit DL PPDUs.

The purpose of each RRH transmitting CTS-to-self frame is to allow each RRH to occupy the channel, since each RRH is at a different location and the channel conditions may be different. This can avoid collisions with third-party transmissions. As mentioned in the previous example, the use of the CTS-to-Self frame and reservation PPDU are optionally transmitted, or can be replaced by, other frames/PPDUs.

In order to avoid the collisions, RRH0 and RRH2 transmit PPDUs carrying the CTS-to-self frame with the same scrambling seed, the same MCS, and the same bandwidth. The RA field of the CTS-to-self frames is the same, such as the MAC address of the CU. This rule should also apply to the reservation PPDU. In addition, the payload of the reservation PPDUs is also preferably identical.

After each RRH tells its availability to the CU, the CU is able to decide which RRHs are to start coordinated transmission. The coordinated transmission could be a joint transmission, coordinated beamforming, coordinated spatial reuse, (MU-)MIMO and so on. Also, in at least one embodiment/mode/option the CU can decide that only one RRH is to transmit.

Figure 9:
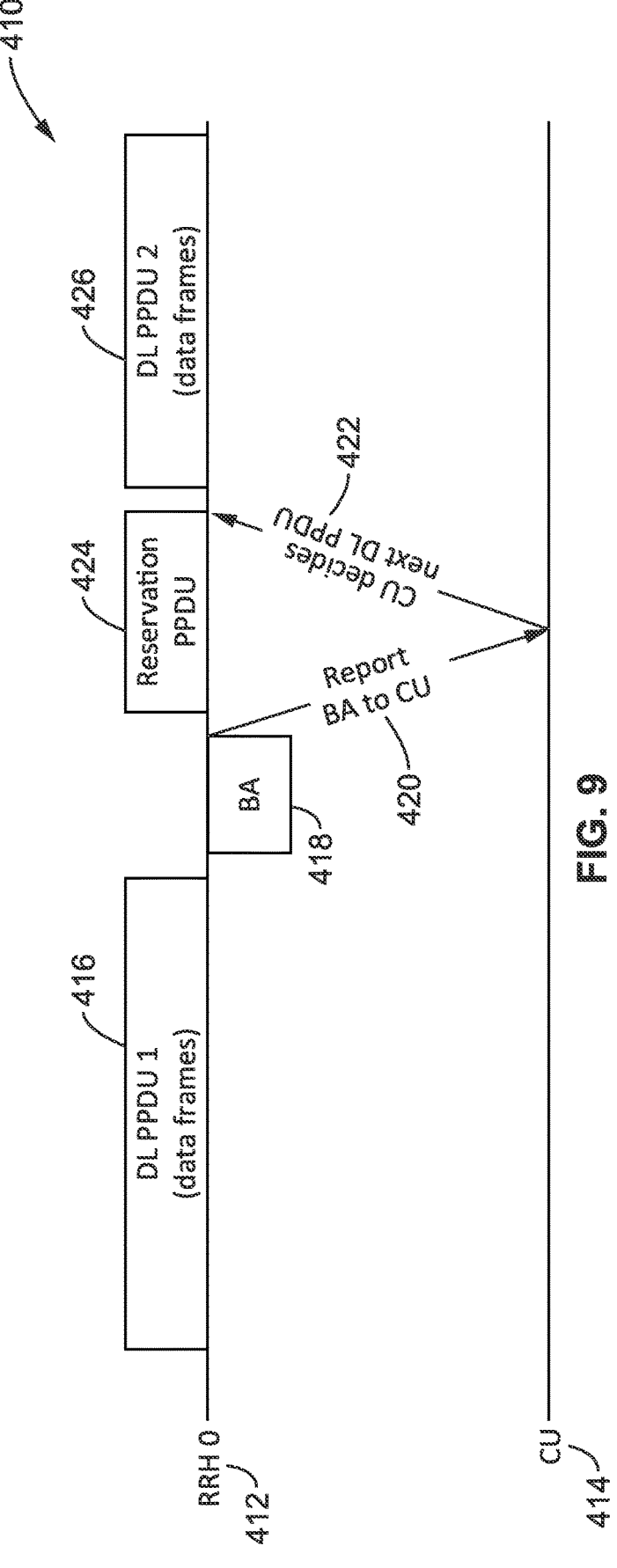
FIG. 9 is a communications diagram of an RRH transmitting a reservation PPDU for the next PPDU transmission according to at least one embodiment of the present disclosure.

FIG. 9 illustrates an example embodiment 410 of an RRH transmitting a reservation PPDU for the next PPDU transmission. The figure depicts interactions between a CU 414 and RRH0 412.

After RRH0 transmits DL PPDU1 416 carrying data frames, it will receive a BA frame 418 as a response from the receiver STA. After RRH0 receives the BA, it needs to report 420 the BA to the CU and allow the CU to communicate 422 its decision on what is to be transmitted in the following PPDU. This may arise because the RRH cannot decode the BA, or the RRH cannot re-encode the retransmission MPDUs, or that the rate control decision is to be made by the CU. For example, if a BA reports some of the frames are not received successfully, the CU needs to control retransmitting those frames in the next PPDU. However, the processing time of reporting the BA to the CU and the CU deciding next DL PPDU (i.e., RTT of the communication between CU and RRH) would extend beyond that of a SIFS time.

As shown in the figure, RRH0 transmits a reservation PPDU 424 first to occupy the channel until the RRH0 receives the message from CU about the next PPDU (e.g., DL PPDU 2). The duration time of the reservation PPDU is longer than the RTT of the communication between CU and RRH. After RRH0 receives the message 422 from the CU about what to transmit for the next DL PPDU, it starts to transmit. As shown in the figure, RRH0 transmits DL PPDU2 426 carrying data frames.

Figures 10, 11:
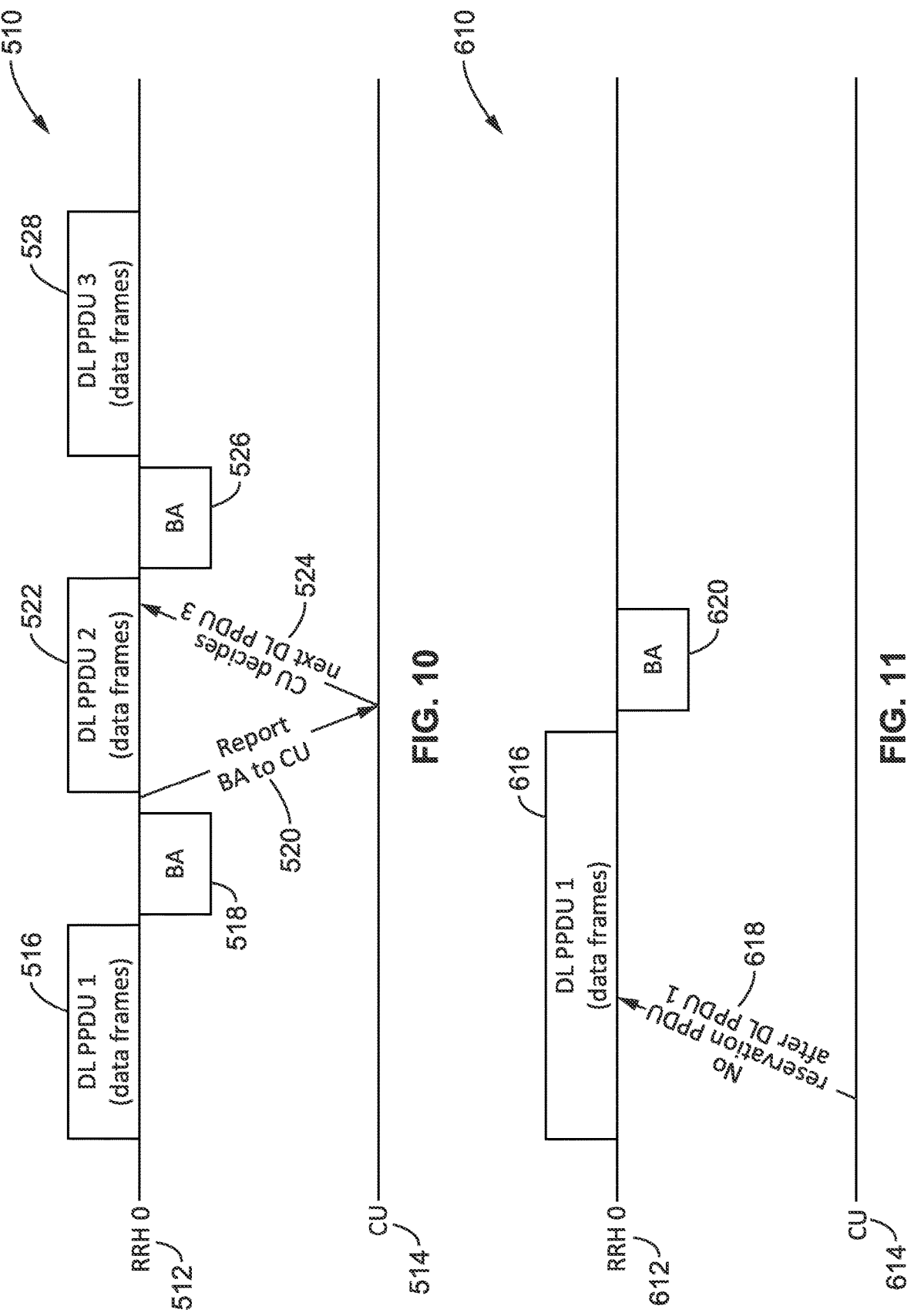
FIG. 10 is a communications diagram of an RRH transmitting another DL PPDU immediately after finishing the previous DL PPDU transmission according to at least one embodiment of the present disclosure.
FIG. 11 is a communications diagram of an RRH not transmitting a reservation PPDU to occupy the channel if the CU decides not to transmit the next PPDU according to at least one embodiment of the present disclosure.

FIG. 10 illustrates an example embodiment 510 of an RRH transmitting another DL PPDU immediately after finishing the previous DL PPDU transmission. Interaction is shown in the figure between CU 514 and RRH0 512.

After RRH0 transmits DL PPDU1 516 and receives BA 518, it reports 520 the BA to the CU. Meanwhile, RRH0 transmits another DL PPDU2 522 carrying data frames. Before it finishes the transmission of DL PPDU2, it receives information 524 from the CU about what and how to transmit in DL PPDU3. Then, after receiving BA 526, RRH0 is shown transmitting DL PPDU3 528, such as carrying data frames.

In this example, RRH0 is considered to have frames of DL PPDU1 and DL PPDU2 buffered in advance so it can transmit them without first receiving direction from the CU.

DL PPDU2 may be transmitted to a different STA than that to which DL PPDU1 was transmitted.

DL PDDU2 can be transmitted to the same STA as that to which DL PPDU1 was transmitted. If the data frames of PPDU2 and PPDU1 are from the same Traffic Identifier (TID), then the Sequence Number (SN) of the data frames of PPDU2 should not affect or change the starting sequence number of the multiple link scoreboard of that TID at the receiver STA. For example, the SN of the data frames of PPDU2 cannot be larger than (the smallest SN of the data frames of PPDU1+WinSize$_R$−1) when fragmentation is not allowed.

DL PDDU2 can be transmitted to the same STA of DL PPDU1. If the data frames of PPDU2 and PPDU1 are from the same TID, then the Sequence Number (SN) of the data frames of PPDU2 should not affect or change the starting sequence number of the receive reordering buffer of that TID at the receiver STA. For example, the SN of the data frames of PPDU2 cannot larger than (the smallest SN of the data frames of PPDU1+WinSize$_B$−1).

FIG. 11 illustrates an example embodiment 610 of an RRH which does not transmit a reservation PPDU to occupy the channel if the CU decides not to transmit the next PPDU. Interaction is shown in the figure between CU 614 and RRH0 612.

As shown in the figure, the CU decides in advance that DL PPDU 1 is the last PPDU that RRH0 is to transmit in the current TXOP, and communicates 618 this to RRH0. Then, after RRH0 transmits PPDU 616, it does not need to transmit a reservation PPDU for the next DL PPDU transmission. RRH is shown receiving a BA 620 in response to sending PPDU 616.

Figure 12:
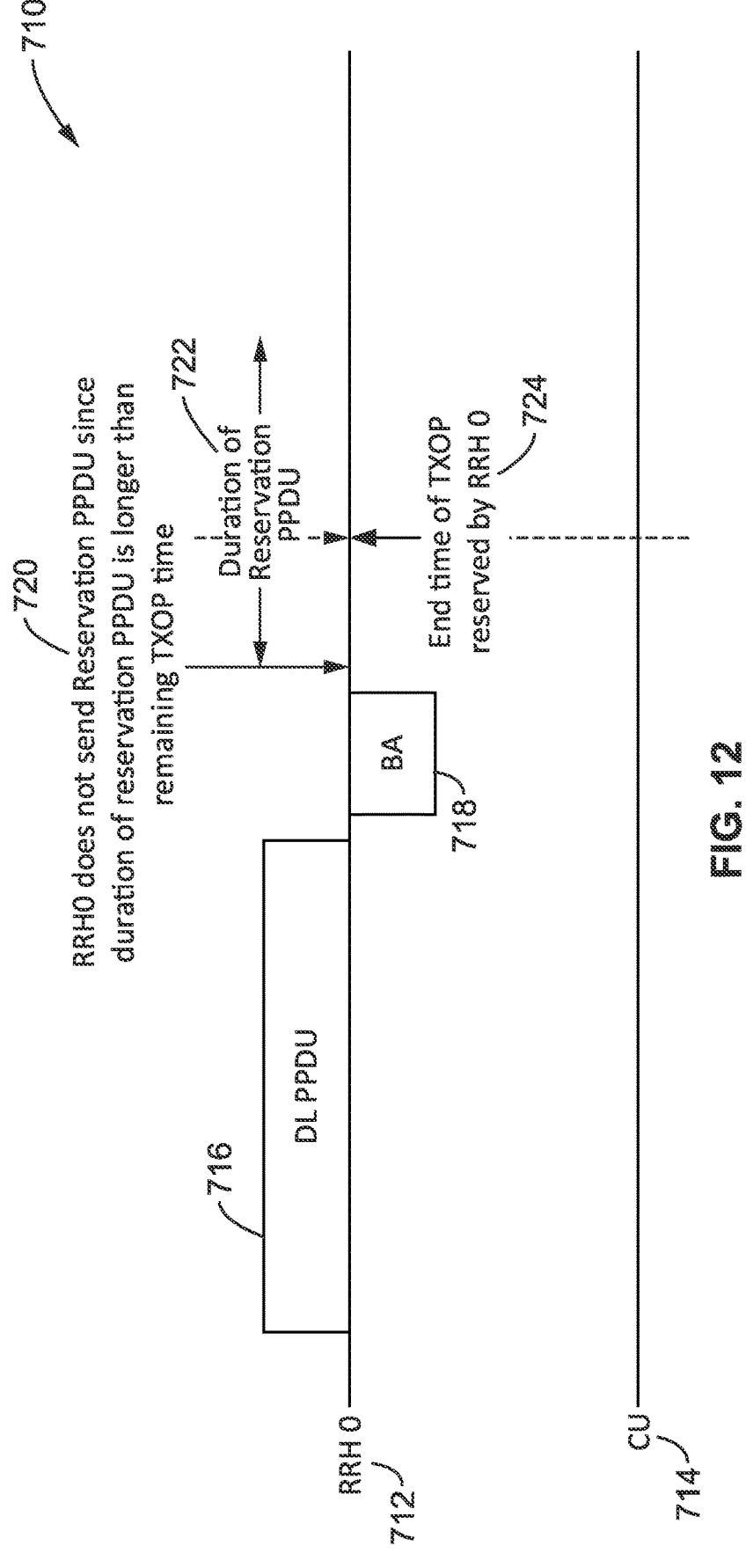
FIG. 12 is a communications diagram of an RRH which is not transmitting a reservation PPDU to occupy the channel according to at least one embodiment of the present disclosure.

FIG. 12 illustrates an example embodiment 710 showing another example of RRH not transmitting a reservation PPDU to occupy the channel. Interaction is shown in the figure between CU 714 and RRH0 712.

RRH0 is shown transmitting PPDU 716, However, as shown in the figure, RRH0 does not then send a reservation PPDU because the duration of reservation PPDU is longer 720 than the remaining 722 TXOP time (or there is no remaining TXOP time 724 for the next DL PPDU). RRH is shown receiving BA 718.

Figure 13:
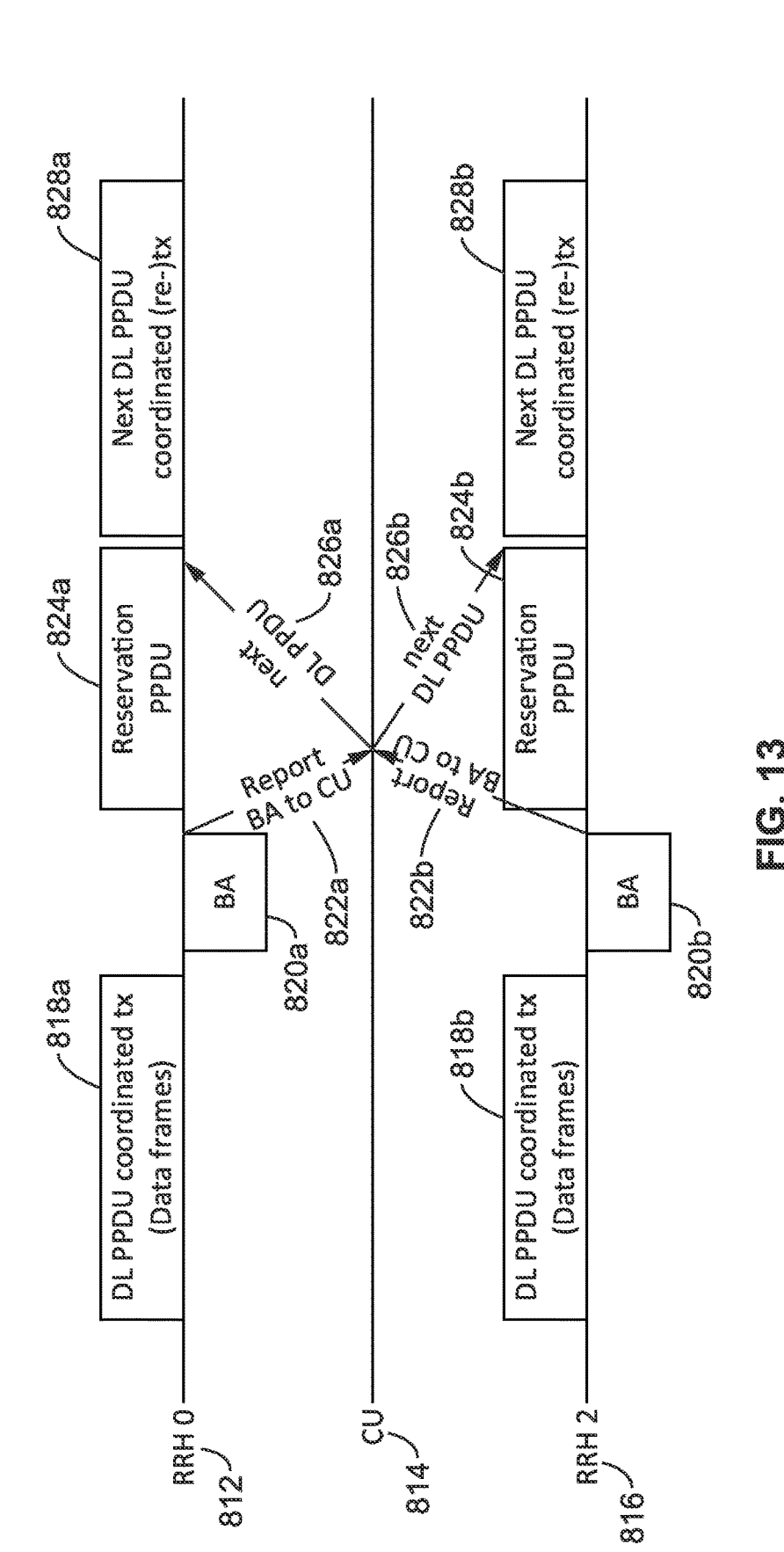
FIG. 13 is a communications diagram of DL coordinated transmission between RRHs according to at least one embodiment of the present disclosure.

FIG. 13 illustrates an example embodiment 810 of DL coordinated transmission between RRHs. Interaction is shown in the figure between CU 814, RRH0 812 and RRH2 816.

As shown in the figure, the CU decides to allow RRH0 and RRH2 to launch coordinated transmissions 818a and 818b, such as coordinated Time-Division Multiple Access (TDMA), coordinated OFDMA, coordinated spatial reuse, MU-MIMO, joint transmission, and/or coordinated beamforming. As shown in the figure, the DL PPDU of the coordinated transmission carries data frames and the RRHs receive the corresponding BAs 820a and 820b in response to these frames.

Then, RRH0 and RRH2 report 822a, 822b the BA to the CU, and the CU decides what to transmit in the next DL PPDUs through RRH0 and RRH2. Since the RTT between RRHs and the CU is longer than a SIFS time, RRH0 and RRH2 transmit reservation PPDUs 824a, 824b to occupy the channel during the RTT. After the reservation PPDU, RRH0 and RRH2 receive the information 826a, 826b of the next PPDUs and start transmitting the next DL PPDU 828a and 828b of the coordinated transmission. If there are data frames that are required to be retransmitted, then the next DL PPDU coordinated transmission will retransmit those data frames.

The type of coordinated transmission may vary depending on the decision of the CU. For example, the first DL PPDU coordinated transmission as shown in the figure is a joint transmission while the second DL PPDU coordinated transmission (the one after reservation PPDU) is coordinated spatial reuse.

Figure 14:
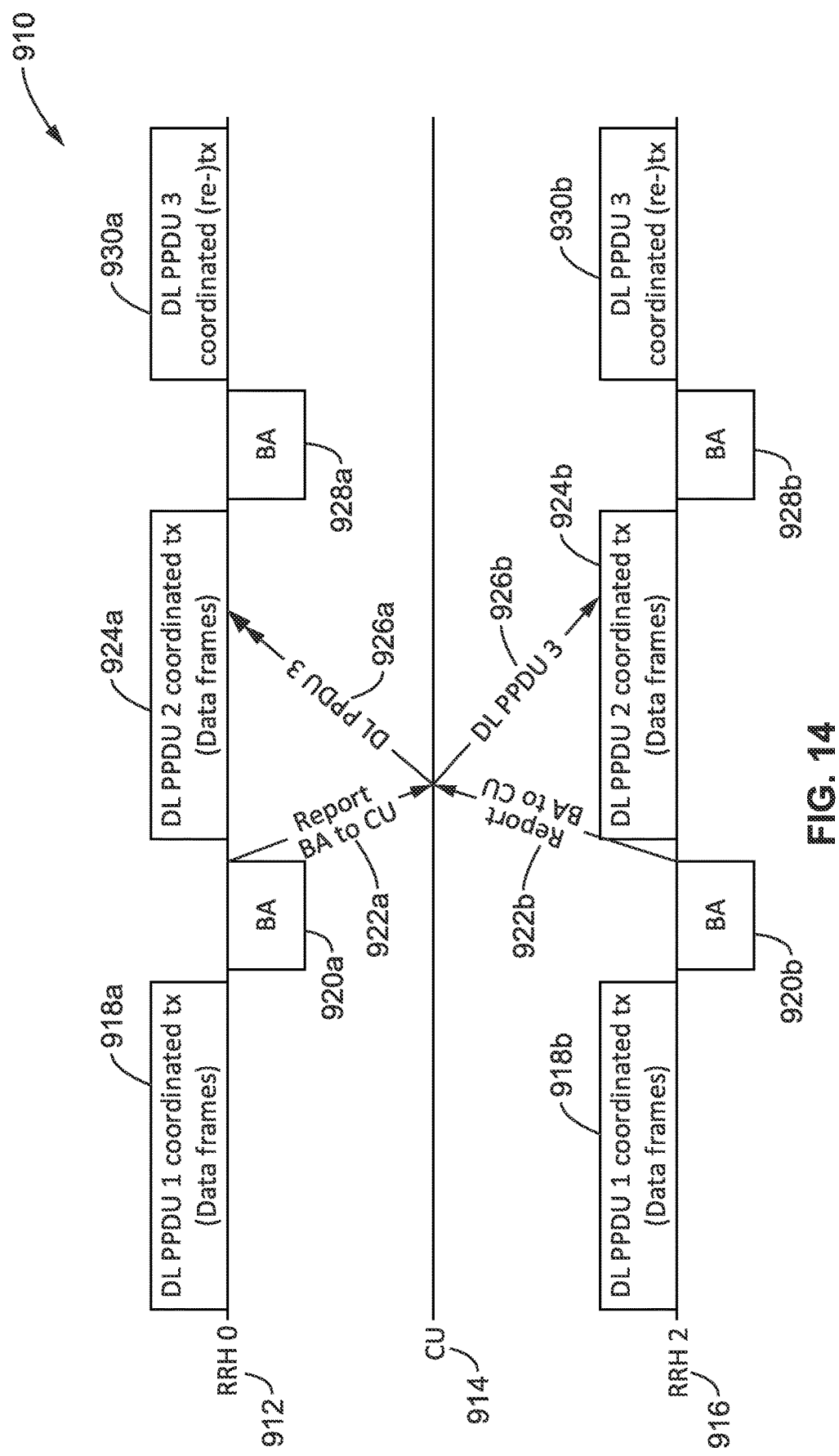
FIG. 14 is a communications diagram of multiple RRHs transmitting another DL PPDU coordinated transmission immediately after finishing the previous DL PPDU transmission according to at least one embodiment of the present disclosure.

FIG. 14 illustrates an example embodiment 910 of multiple RRHs transmitting another DL PPDU coordinated transmission immediately after finishing the previous DL PPDU transmission. Interaction is shown in the figure between CU 914, RRH0 912 and RRH2 916.

After RRH0 and RRH2 transmit DL PPDU1 coordinated transmissions 918a, 918b and receive the BAs 920a, 920b, they report 922a, 922b the BAs to the CU. Meanwhile, RRH0 and RRH2 transmit another coordinated transmission with DL PPDU2 924a, 924b carrying data frames. Before it finishes the transmission of DL PPDU2, the RRHs receive information 926a, 926b from the CU about what and how to transmit in DL PPDU3 coordinated transmission. Then, RRH0 and RRH2, after receiving BA 928a, 928b, transmit DL PPDU3 930a, 930b in a coordinated transmission.

DL PPDU1 coordinated transmission and DL PPDU2 coordinated transmission should be shared between RRH0 and RRH2 in advance.

DL PDDU2 can be transmitted to the same STA of DL PPDU1. If the data frames of PPDU2 and PPDU1 are from the same TID, then the SN of the data frames of PPDU2 should not affect or change the starting sequence number of the scoreboard of that TID at the receiver STA. For example, the SN of the data frames of PPDU2 cannot be larger than (the smallest SN of the data frames of PPDU1+WinSize$_R$−1) when fragmentation is not allowed.

DL PDDU2 can be transmitted to the same STA of DL PPDU1. If the data frames of PPDU2 and PPDU1 are from the same TID, then the SN of the data frames of PPDU2 should not affect or change the starting sequence number of the receive reordering buffer of that TID at the receiver STA. For example, the SN of the data frames of PPDU2 cannot be larger than (the smallest SN of the data frames of PPDU1+ WinSize$_B$−1) when fragmentation is not allowed.

Figure 15:
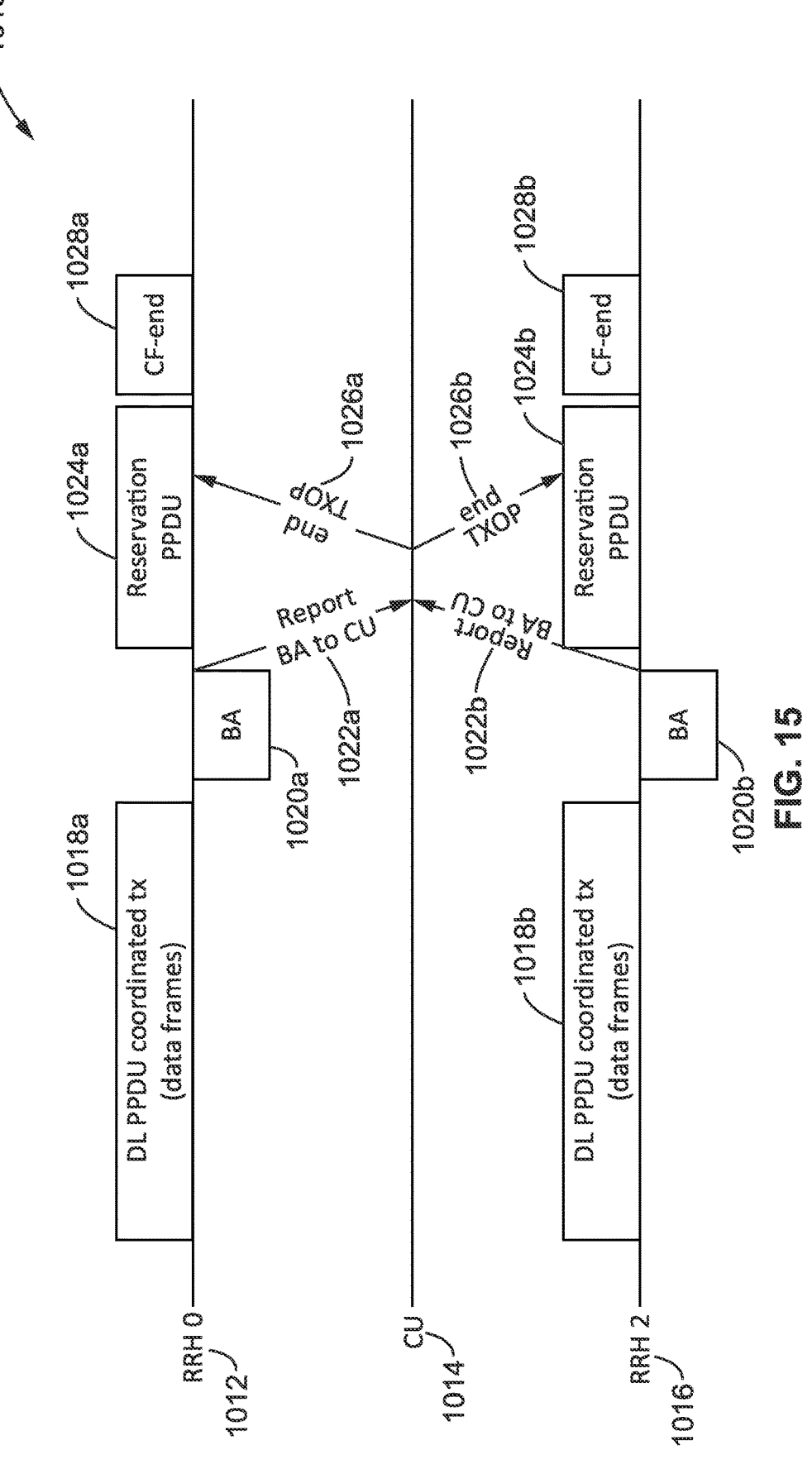
FIG. 15 is a communications diagram of terminating a TXOP according to at least one embodiment of the present disclosure.

FIG. 15 illustrates an example embodiment 1010 of terminating a TXOP. Interaction is shown in the figure between CU 1014, RRH0 1012 and RRH2 1016.

Compared with the previous example, after the PPDUs 1018$a$, 1018$b$, when RRH0 and RRH2 report 1022$a$, 1022$b$ the received BA(s) 1020$a$, 1020$b$ to the CU, the CU decides to end (terminate) the current TXOP. During this delay RRH0 and RRH2 are performing a reservation PPDU 1024$a$, 1024$b$ Then, after the reservation PPDU, the CU decides to end the current TXOP and forwards its decision 1026$a$, 1026$b$ to the RRHs. Then, RRH0 and RRH2 transmit (broadcast) CF-end frame 1028$a$, 1028$b$ to terminate the TXOP.

4.4. Uplink Transmission

This section describes an RRH launching a UL transmission with a STA. The network topology is shown in FIG. 5. The MAC data plane architecture between CU and RRH is shown as in Section 4.5, which can be configured to be either legacy compatibility or non-legacy compatibility.

Figure 37:
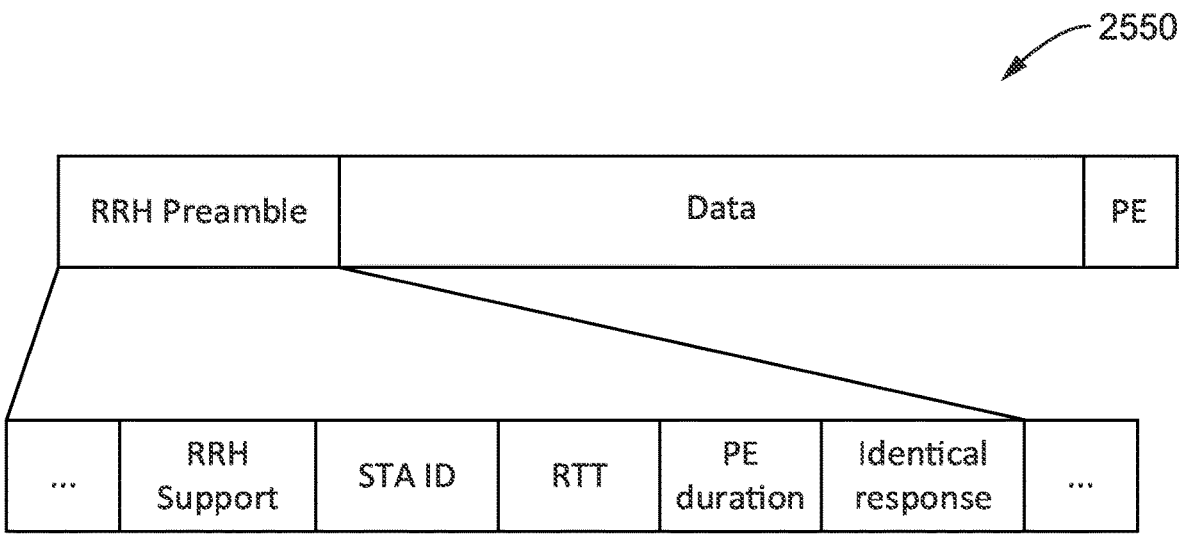
FIG. 37 is a data field diagram of an RRH PPDU format according to at least one embodiment of the present disclosure.

In at least one embodiment/mode/option the RRH can identify that the received PPDU supports the RRH feature as shown in FIG. 37. Otherwise, the RRH recognizes (knows) that the PPDU is transmitted by a legacy STA.

4.4.1. Transmission with Legacy STA

This section describes how an RRH launches a UL transmission with legacy STA. The MAC data plane architecture between CU and RRH is shown as in Section 4.5, which can be legacy compatibility. It should be noted that the procedure of UL transmission described in this section can also be used for the UL transmission with the STAs which support RRH.

Figure 16:
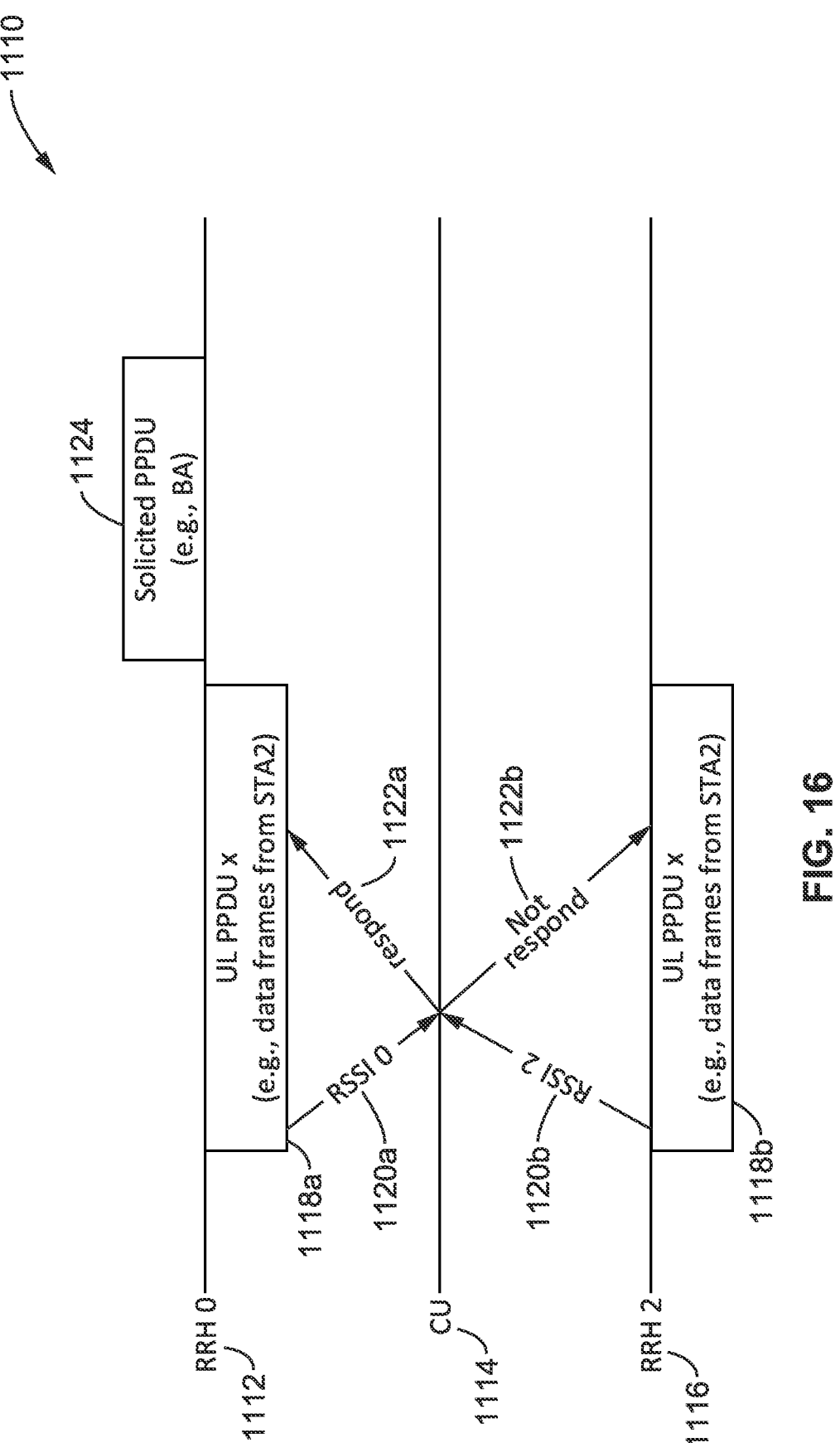
FIG. 16 is a communications diagram of the RRH responding depending on the RSSI of the received PPDU according to at least one embodiment of the present disclosure.

FIG. 16 illustrates an example embodiment 1110 of the RRH responding depending on the Received Signal Strength Indication (RSSI) of the received PPDU. Interaction is shown in the figure between CU 1114, RRH0 1112 and RRH2 1116.

When multiple RRHs receive the same PPDU, only the RRH where the RSSI of the received UL PPDU is the highest responds. As shown in the figure, RRH0 and RRH2 receive an UL PPDU 1118$a$, 1118$b$, such as UL PPDUx carrying data frames from STA2. The RSSIs 1120$a$, 1120$b$ of the UL PPDU (e.g., the RSSI of the preamble of the UL PPDU) at RRH0 and RRH2 are denoted by RSSI0 and RSSI2, respectively. RRH0 and RRH2 forward the RSSI0 and RSSI2 to the CU, and the CU asks (requests from) the RRH which has the highest RSSI to respond the UL PPDU. In this example, RSSI0 is higher than RSSI2, so the CU directs RRH0 to respond 1122$a$, while the CU indicates that RRH2 is not to respond 1122$b$ to RSSI2. RHH0 sends a solicited PPDU 1124 carrying BA frames in response to the data frames in UL PPDUx.

Figure 17:
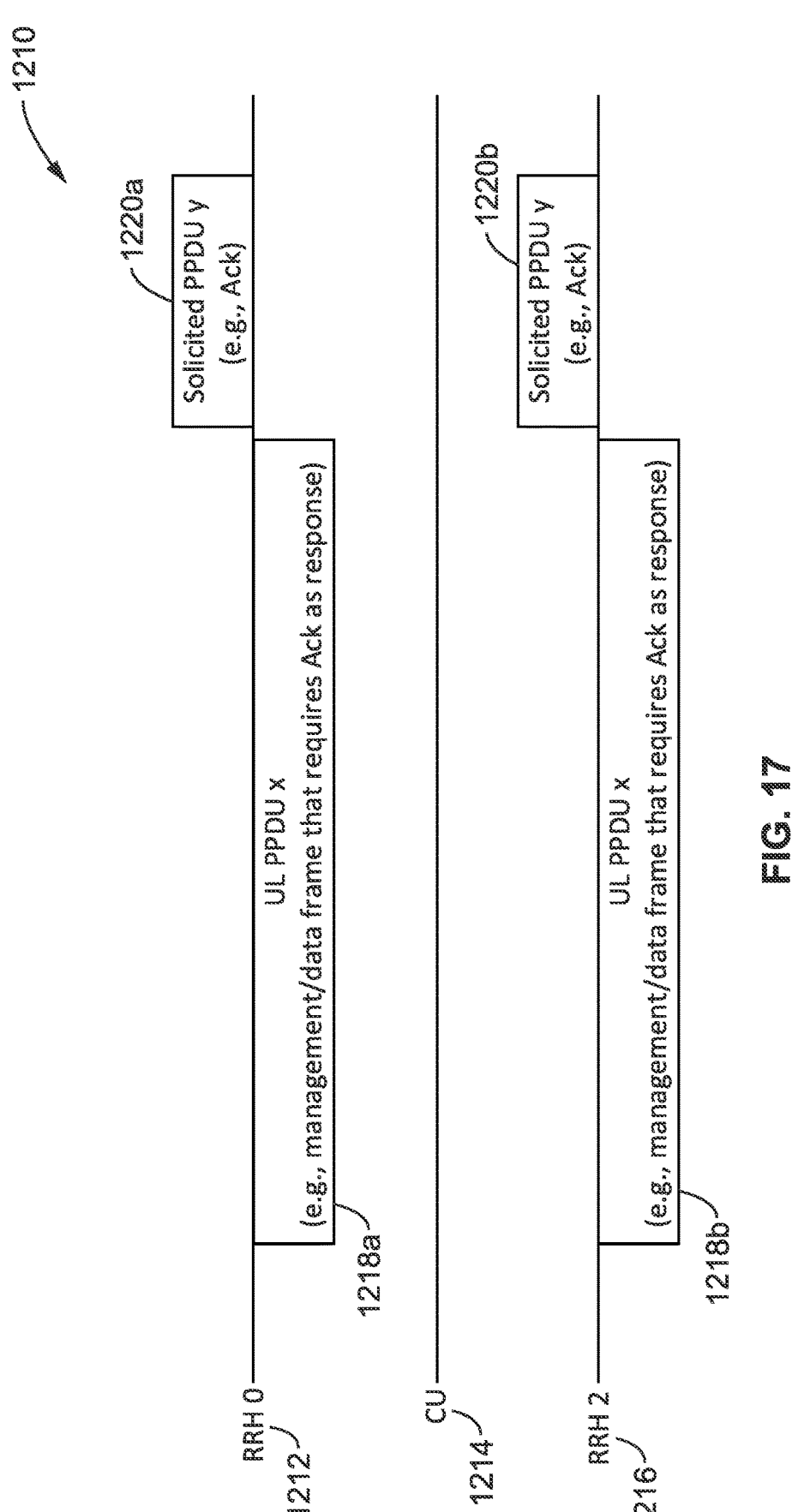
FIG. 17 is a communications diagram of all the RRHs responding to the same solicited PPDU according to at least one embodiment of the present disclosure.

FIG. 17 illustrates an example embodiment 1210 of all the RRHs responding to the same solicited PPDU. Interaction is shown in the figure between CU 1214, RRH0 1212 and RRH2 1216.

As shown in the figure, RRH0 and RRH2 receive UL PPDU 1218$a$, 1218$b$, such as UL PPDUx. This example considers a case in which the UL PPDUx carries a management or data frame that requires an Ack response. Accordingly, RRH0 and RRH2 can transmit a solicited PPDU y 1220$a$, 1220$b$ which carries the Ack response. It should be noted that the scrambling seed of the solicited PPDUy should be the same when it is transmitted by RRH0 and RRH2.

In order to determine whether the management or data frame requires an Ack response, the RRH may have to decode the frame in the PPDU by itself. In at least one embodiment/mode/option the determination is made by decoding the frame control field only. For a data frame, RRH may check the TID of the data frame. If the TID of the data frame has no BA session established, then it sends an Ack frame as response. Otherwise, it sends a BA as response.

The solicited PPDU can be identical when the UL PPDU carries an Ack-enabled multi-TID A-MPDUs and all the frames require an Ack response. Then, RRH only responds with the Multi-STA BlockAck carrying all the Ack responses when all the frames are received correctly.

The scrambling seed may be generated depending on the TSF timing. If it is assumed that RRH0 and RRH2 share the same TSF timing; then they can share the same algorithm, whereby the TSF timing is input to generate the same scrambling seed for the solicited PPDU y.

Figure 18:
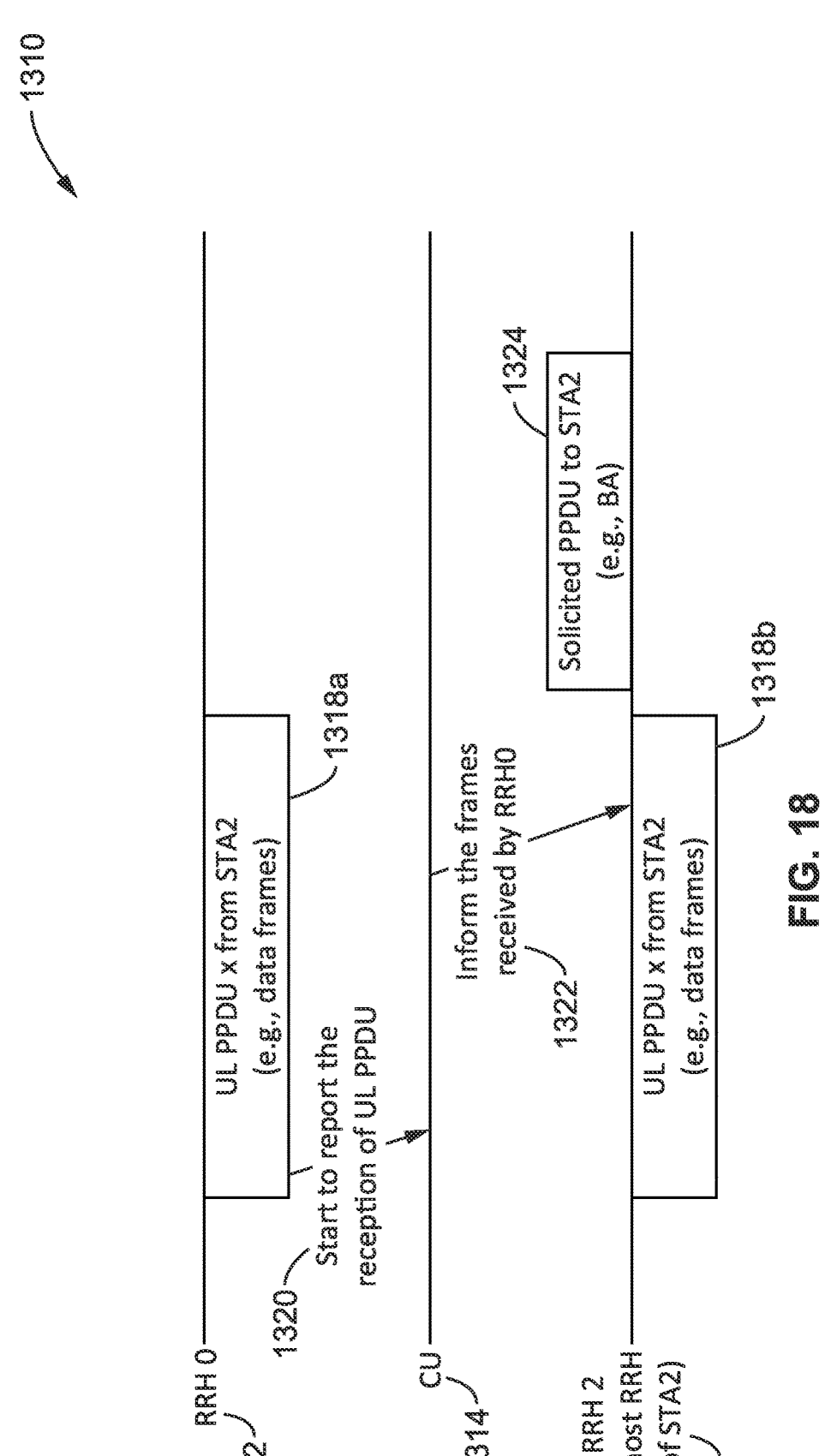
FIG. 18 is a communications diagram of the host RRH responding to a solicited PPDU according to at least one embodiment of the present disclosure.

FIG. 18 illustrates an example embodiment 1310 of the host RRH responding to a solicited PPDU. Interaction is shown in the figure between CU 1314, RRH0 1312 and RRH2 1316.

Each associated STA is assigned a RRH which is responsible for the response to that associated STA, denoted as the host RRH of that associated STA. As shown in the example, RRH2 is the host RRH of STA2. When STA2 transmits UL PPDUx 1318$a$, 1318$b$ which carries data frames, both RRH0 and RRH2 will hear and receive UL PPDUx from STA2. Since RRH0 is not the host RRH of STA2, it will not send any solicited PPDU in response to the UL PPDU x from STA2. However, RRH0 can still receive UL PPDU x from STA2 and report them to the CU. RRH0 can elect to report 1320 the reception of UL PPDUx at the beginning time of receiving the UL PPDUx so that the CU can forward the (partial) reception status 1322 of UL PPDUx at RRH0 to RRH2. Then, RRH2 can combine the reception status from RRH0 and RRH2 to generate the solicited PPDU 1324, such as solicited PPDU carrying BA, to respond.

The host RRH of a STA can be determined by the CU based on the link quality between the RRH and the CU. For example, the CU can decide the RRH which has the best RSSI from the STA to be the host RRH of that STA.

The host RRH of a STA can be changed if the link quality between the RRH and the CU changes. For example, as shown in the figure, if the RSSI from STA2 at RRH0 becomes better than that at RRH2, then the host RRH of STA2 can switch from RRH2 to RRH0.

4.4.2. Transmission with RRH Support STA

This section describes how RRH launches a UL transmission with a STA that supports RRH. The MAC data plane architecture between CU and RRH is shown as in Section 4.5, which by way of example may be non-legacy compatibility. This session assumes that the decoding of the frames occurs at the CU.

Figure 19:
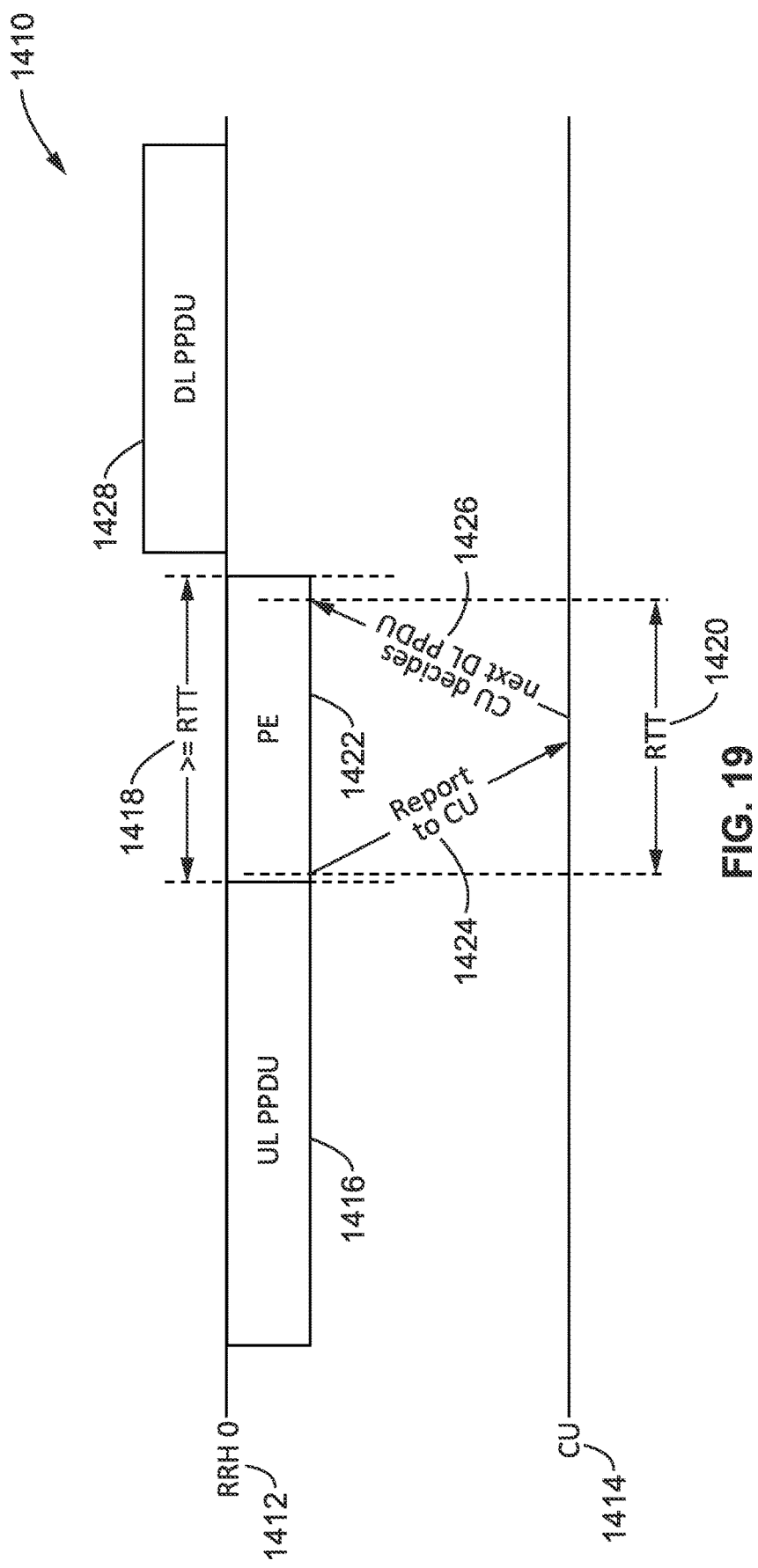
FIG. 19 is a communications diagram of the STA adding a packet extension (PE) field in the UL PPDU it transmits to the RRH AP according to at least one embodiment of the present disclosure.

FIG. 19 illustrates an example embodiment 1410 of the STA adding a packet extension (PE) field in the UL PPDU it transmits to the RRH AP. Interaction is shown in the figure between CU 1414 and RRH0 1412.

A UL PPDU 1416 is received by RRH0. The transmission was extended by the STA with a Packet Extension (PE) 1422. During the PE duration of the UL PPDU, RRH0 reports 1424 the UL PPDU to the CU and the CU decides on the DL PPDU to transmit through RRH0 and directs 1426 RRH0. Then, RRH0 transmits DL PPDU 1428 within a SIFS time after the end of the PE of the UL PPDU.

In at least one embodiment/mode/option the transmission only requires the duration 1418 of PE+a SIFS time be greater than or equal to RTT 1420 instead of the duration of PE>RTT.

The PE time may vary depending on the processing time of the UL PPDU at RRH0 and the CU. For example, the CU may require more time to process the UL PPDU as the length of the frames in the UL PPDU increases.

Figure 20:
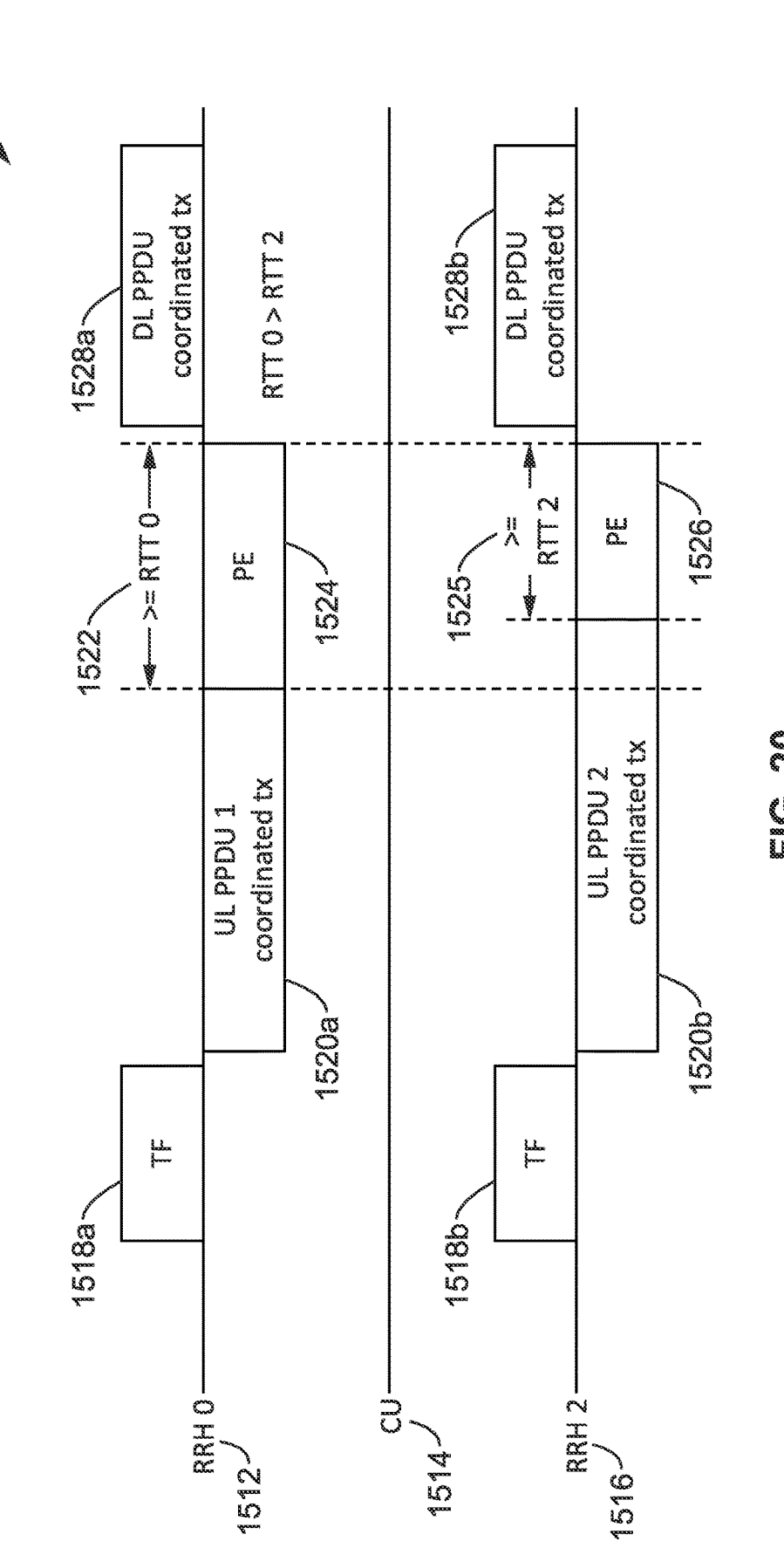
FIG. 20 is a communications diagram in which RTTs of different RRHs are different as utilized according to at least one embodiment of the present disclosure.

FIG. 20 illustrates an example embodiment 1510 in which RTTs of different RRHs are different. Interaction is shown in the figure between CU 1514, RRH0 1512 and RRH2 1516.

In the figure we see RRH0 and RRH2 sending trigger frames (TFs) 1518a, 1518b. Then, UL PPDUs 1520a, 1520b, are received which may have different PE durations 1524, 1526 depending on which RRH is receiving the UL PPDU. As shown in the figure, RRH0 and RRH2 receive UL PPDU1 and UL PPDU2, respectively. The PE durations of UL PPDU1 and UL PPDU2 are different. PE 1524 duration 1522 in UL PPDU1 is longer than or equal to RTT0. The PE duration 1525 of UL PPDU 2 is longer or equal to RTT2. As shown in the figure, RTT0 is longer than RTT2. RRH0 and RRH2 use the PE duration of UL PPDU1 and UL PPDU2 to communicate with the CU, respectively. Then, RRH0 and RRH2 start DL PPDU coordinated transmission 1528a, 1528b after the UL PPDU coordinated reception.

It should be noted that although UL PPDU1 and UL PPDU2 are launched by RRH0 and RRH2 transmitting a trigger frame to the corresponding STAs; this is optional aspect of this example. Otherwise, the coordinated communication of UL PPDU1 and UL PPDU2 can be coordinated by OFDMA, coordinated spatial reuse, MU-MIMO, coordinated beamforming.

It should be noted that the PE duration of the UL PPDUs should not break OFDM symbol orthogonality.

Figure 21:
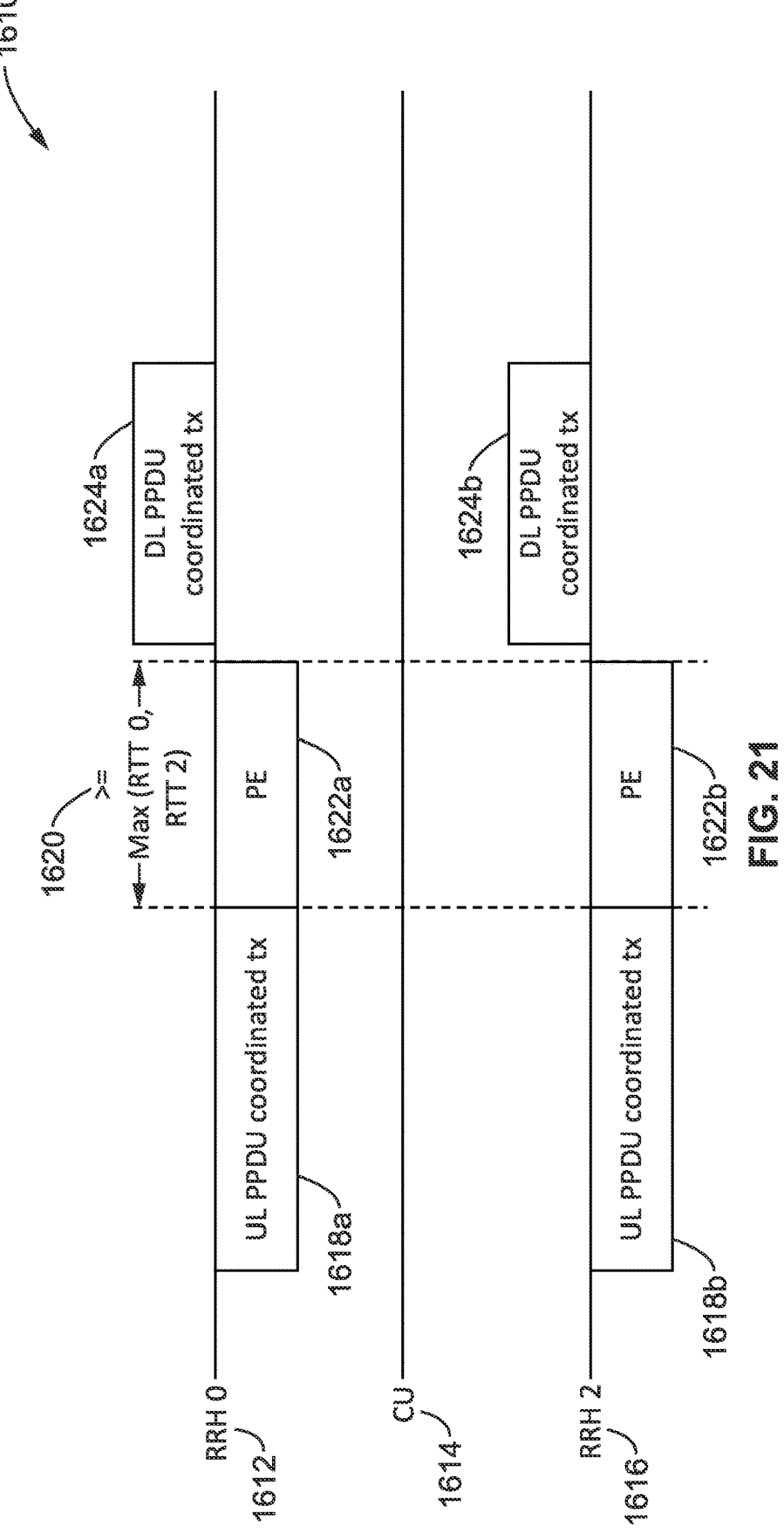
FIG. 21 is a communications diagram in which PE duration should be longer than the max RTT of the RRHs to ensure all the RRHs can have sufficient time to forward the signal of the received UL PPDU to the CU according to at least one embodiment of the present disclosure.

FIG. 21 illustrates an example embodiment 1610 in which PE duration should be longer than the maximum RTT of the RRHs to ensure all the RRHs can have sufficient time to forward the signal of the received UL PPDU to the CU. Interaction is shown in the figure between CU 1614, RRH0 1612 and RRH2 1616.

For example, reception is seen of UL PPDU coordinated transmission 1618a, 1618b, with PE 1622a, 1622b, which is exemplified as a UL MU-MIMO transmission. The CU needs to collect all the signals received from the RRHs to decode the UL PPDU. Then, the CU informs each RRH the manner in which to transmit the follow-up DL PPDU, which can also be a coordinated transmission. PE duration 1620 should be equal to or longer than the maximum RTT of these RRHs to ensure that all the RRHs are provided sufficient time to forward the signal of the received UL PPDU to the CU. It should be noted that the coordinated DL PPDU transmission 1624a, 1624b may contain different Ack status.

4.4.3. Transmission w/Mixed Legacy STA and RRH Support STA

Figure 22:
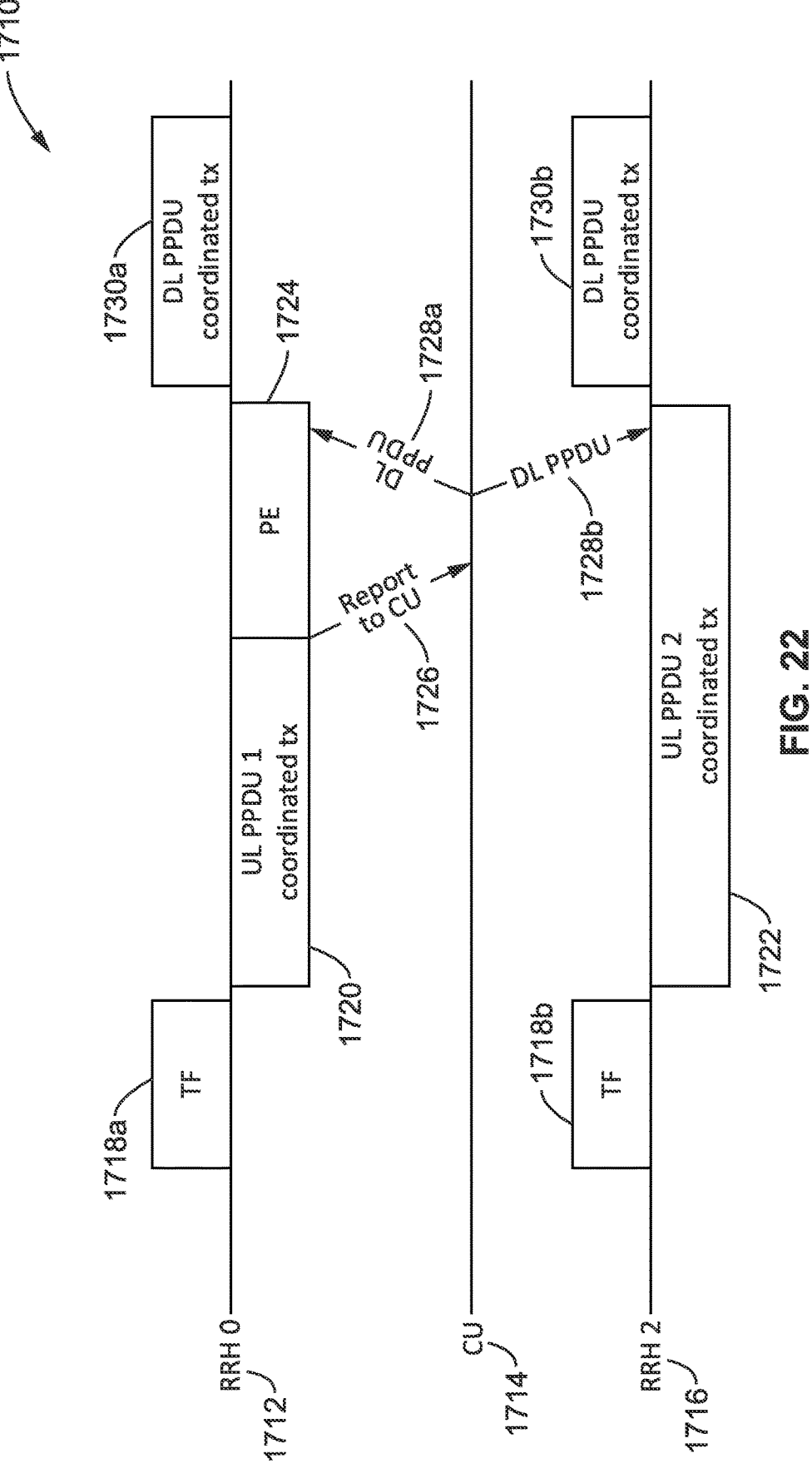
FIG. 22 is a communications diagram of UL PPDU coordinated transmission from a legacy STA and a RRH support STA according to at least one embodiment of the present disclosure.

FIG. 22 illustrates an example embodiment 1710 in which the UL PPDU coordinated transmission is from a legacy STA and a RRH support STA. Interaction is shown in the figure between CU 1714, RRH0 1712 and RRH2 1716.

In the example, RRH0 and RRH2 have sent TFs 1718a, 1718b, and received UL PPDUs 1720, 1722. These PPDUs as seen, may have different PE durations 1724, depending on which RRH receiving the UL PPDU. As shown in the figure, RRH0 and RRH2 receive UL PPDU1 and UL PPDU2, respectively. UL PPDU1 has PE field 1724 that supports centralized decoding and UL PPDU2 has a PE field which is for decentralized decoding. For example, if RRH0 receives UL PPDU1, it can use the PE duration of UL PPDU1 to decode the frames in the UL PPDU1 at the CU. If RRH2 receives UL PPDU2, then it has to decode the internal frames by itself.

During the PE field of UL PPDU1, the RRH may report 1726 it to the CU, and the CU can decide and communicate 1728a to RRH0 what and how to transmit the solicited DL PPDU coordinated transmission 1730a, 1730b. The CU may share its decision, which is shown here 1728b, with all the RRHs which involve in the solicited DL PPDU coordinated transmission. The CU may decide on the content of the DL PPDU in response to the UL PPDU1 and parameters, such as the duration, the rate control, the transmission power, and PPDU format, of the coordinated transmission.

Since the frames in UL PPDU2 are decoded by RRH, the RRH may decide the content of the response by itself. However, it follows the parameters of the coordinated transmission decided by the CU. If there is TF frame, the CU may decide which RRH is to prepare the response to UL PPDU2 in the TF frame. Otherwise, the response to UL PPDU2 can be prepared by the host RRH only. Also, in at least one embodiment/mode/option the RRHs can respond if the response is unique.

It will be noted that although UL PPDU1 and UL PPDU2 are exemplified here as being launched in response to RRH0 and RRH2 transmitting trigger frames to the corresponding STAs; the use of the trigger frames is optional.

The coordinated transmission of UL PPDU1 and UL PPDU2 can be coordinated OFDMA, coordinated spatial reuse, MU-MIMO, coordinated beamforming. It should be noted that RRH0 or RRH2 may be able receive both PPDU1 and PPDU2 successfully.

It should be noted that the PE duration of the UL PPDUs should not break OFDM symbol orthogonality.

4.5. MAC Data Plane Architecture

This section exemplifies certain MAC data plane architectures of an RRH AP. It should be appreciated that these examples are provided by way of example, and not as limitations on the practice of the present disclosure. One of ordinary skill in the art will appreciate that elements of these examples may be combined in various ways without departing from the present teachings.

The functionalities of the MAC data plane are split into the CU MAC sublayer and the RRH MAC sublayer. The function split of the MAC data plane results in two types of RRH AP, i.e., decentralized decoding and centralized decoding. Both of them can transmit DL PPDUs to legacy STAs and the STAs supporting RRH. The difference is that an RRH AP configured for decentralized decoding can decode the frames of the PPDU by itself while the RRH AP that is using centralized decoding cannot. The RRH AP that is configured for decentralized decoding is legacy compatibility and supports receiving a PPDU from a legacy STA, and sending responses with a SIFS time while an RRH AP that is centralized is unable to do so.

When the CU is software defined, then in at least one embodiment/mode/option a CU affiliates with an RRH configured for decentralized decoding and an RRH that is configured for centralized decoding at the same time. The CU can identify what functionalities are implemented in the RRH to decide the remaining procedure to process at the CU side.

4.5.1. Decentralized Decoding

Figure 23:
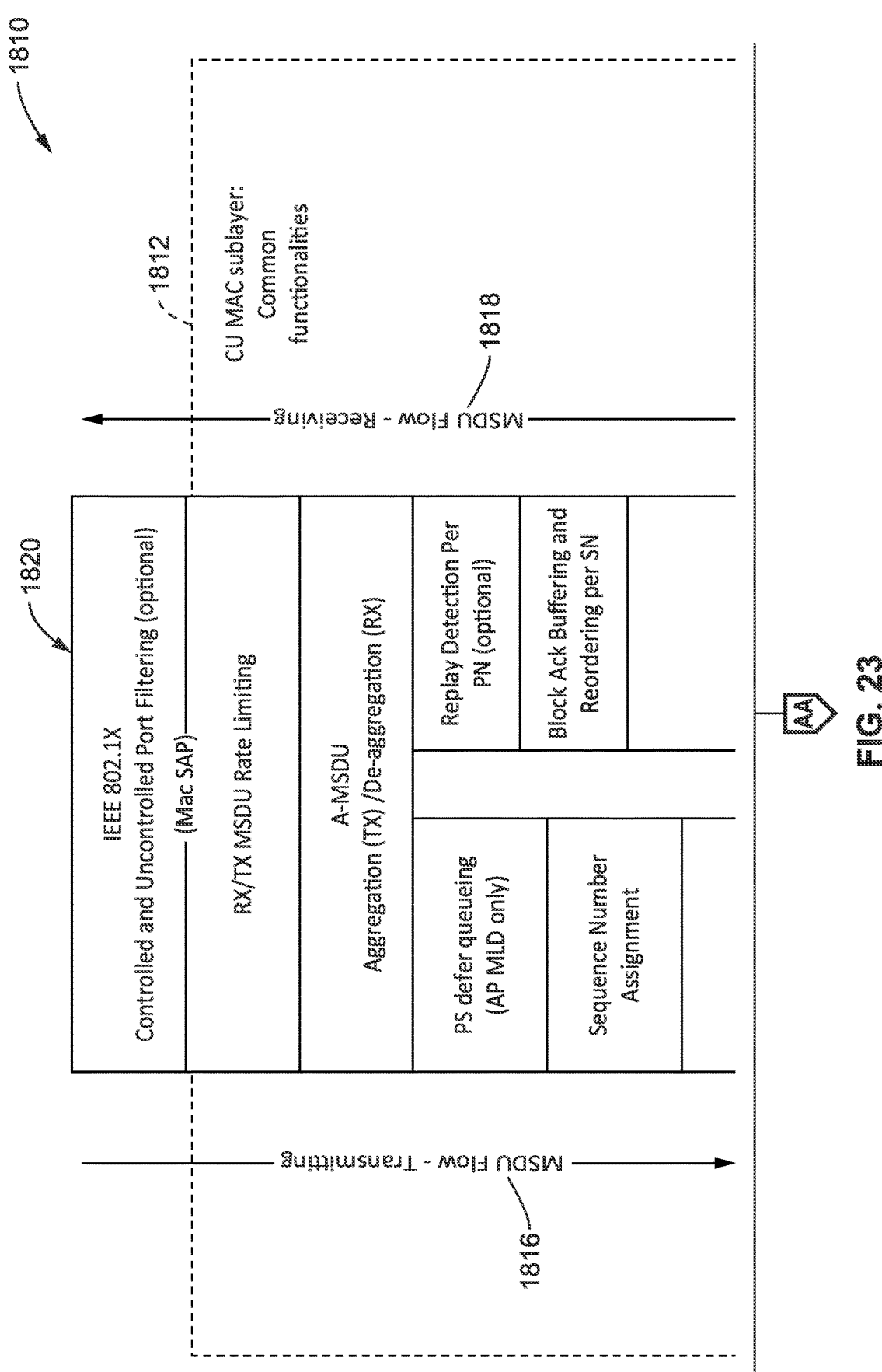
FIG. 23 through FIG. 25 is a data plane architecture for unicast data frames which represent decentralized decoding (legacy compatible) according to at least one embodiment of the present disclosure.
Figure 24:
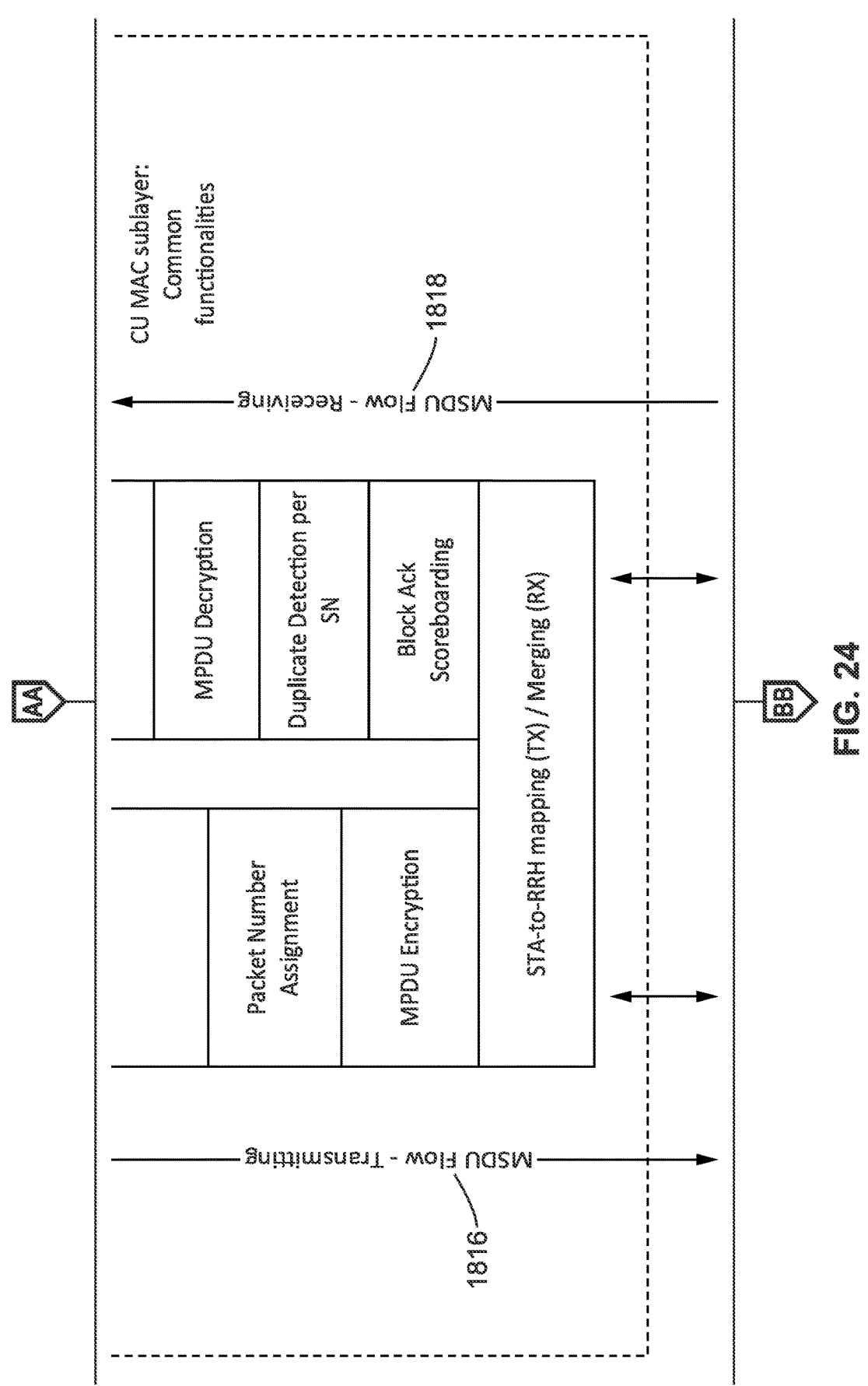
Figure 25:
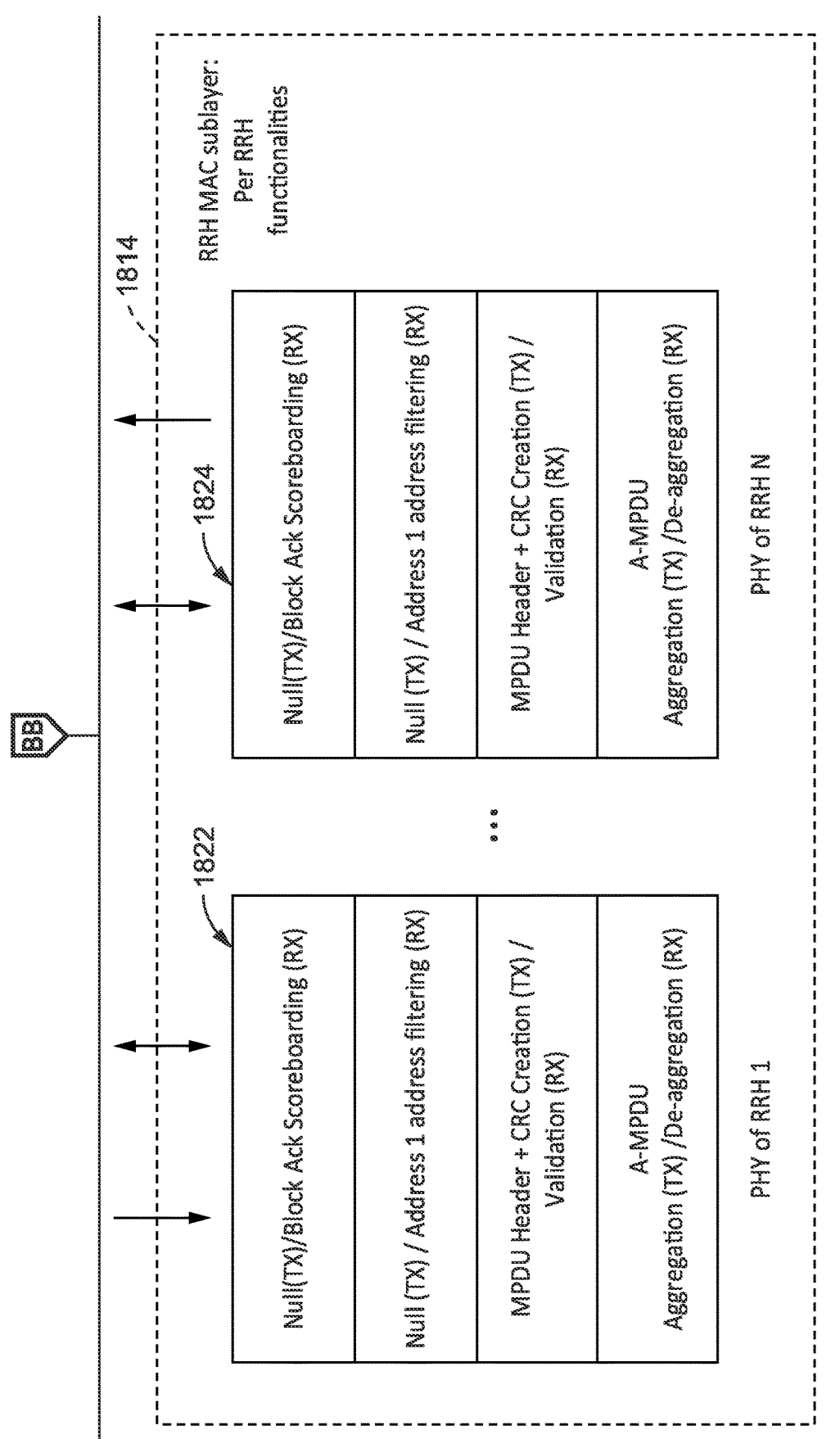

FIG. 23 through FIG. 25 illustrate an example embodiment 1810 of the MAC data plane architecture 1820 for unicast data frames that is decentralized decoding (or legacy compatibility). That is, when an RRH receives a PPDU, it is able to decode the frames in the PPDU by itself and then forward those frames to the CU. This architecture is for legacy compatibility and is required to communicate with the legacy STAs. The functionalities are split by the CU MAC sublayer 1812 and RRH MAC sublayer 1814.

CU MAC sublayer is shown with IEEE 802.1X controlled and uncontrolled port filtering (optional), RX/TX MSDU rate limiting, M-MSDU Aggregation (TX) and De-aggregation (RX). In a first direction (TX) 1816 is then seen PS defer queuing (AP MLD only), sequence number assignment, packet number assignment, MPDU encryption, before STA-to-RRH mapping (TX) and merging (RX). In the reverse direction (RX) 1818 is seen block Ack scoreboarding, duplicate detection per SN, MPDU decryption, block Ack buffering and reordering per SN, and replay detection per PN (optional).

For an RRH AP, one or more RRHs are affiliated with an CU. During transmission, an MSDU from the MAC Service Access Point (SAP) goes through the process 1816 for unicast data frames, then through the STA-to-RRH mapping for RRH1 1822, and for RRHN that forwards the MPDU down to one or more RRH MAC sublayers and then to the corresponding PHY SAP.

In particular, the functionalities for the transmission process 1816 at the CU MAC sublayer include A-MSDU Aggregation, PS defer queueing, Sequence number assignment, packet number assignment, MPDU encrypting and STA-to-RRH mapping along the transmitting MSDU flow as shown in the figure. Each functionality except STA-to-RRH mapping can be the same as defined in IEEE 802.11be.

The functionalities for the transmission process at each RRH MAC sublayer include MPDU header+CRC creation and A-MPDU aggregation along the transmitting MSDU flow as shown in the figure. Each functionality can be the same as defined in IEEE 802.11 be.

The STA-to-RRH mapping can decide which RRH(s) the CU forwards the MSDUs down to, and how to transmit those MSDUs at the PHY layer depending on the recipient STA of the MSDUs.

The CU can forward the MSDUs to one RRH, such as the host RRH of the recipient STA of those MSDUs, to transmit. In this case, the RRH may decide how to transmit those MSDUs at the PHY layer, such as omni-directional transmission or beamforming.

The CU can forward the MSDUs to one or more RRHs for coordinated transmission between those RRHs. In this case, the RRH may decide how to transmit those MSDUs at the PHY layer at each RRH. For example, the CU can decide to perform joint transmissions through multiple RRHs and the signal processing procedure for the joint transmissions of those MSDUs.

During reception, MPDUs originating from different PHY SAPs of each RRH first go through an RRH MAC sublayer, followed by a merging process, and then go through processes shown in the right-hand side of the figure. Then, as defined in IEEE 802.11, one or more MSDUs are delivered to the MAC SAP or, via DSAF to the DS. The IEEE 802.1X Controlled/Uncontrolled Ports discard any received MSDUs if the Controlled Port is not enabled and if the MSDU does not represent an IEEE 802.1X frame.

The functionalities 1824 for the reception process 1818 at each RRH MAC sublayer include A-MPDU de-aggregation, MPDU Header+CRC validation, Address 1 address filtering and block Ack score boarding along the receiving MSDU flow as shown in the figure. Each functionality can be the same as defined in IEEE 802.11 be.

The functionalities for the reception process at CU MAC sublayer include STA-to-RRH merging, block Ack scoreboarding, duplicate detection per SN, MPDU decryption, block Ack buffering and reordering per SN, replay detection per PN, A-MSDU de-aggregation, along the transmitting MSDU flow as shown in the figure. Each functionality except STA-to-RRH merging can be the same as that defined in IEEE 802.11 be.

The STA-to-RRH merging can decide which STA the MSDU is received from at each RRH. For the same MSDU, multiple RRHs can receive it at the same time and forward it to the CU.

Figure 26:
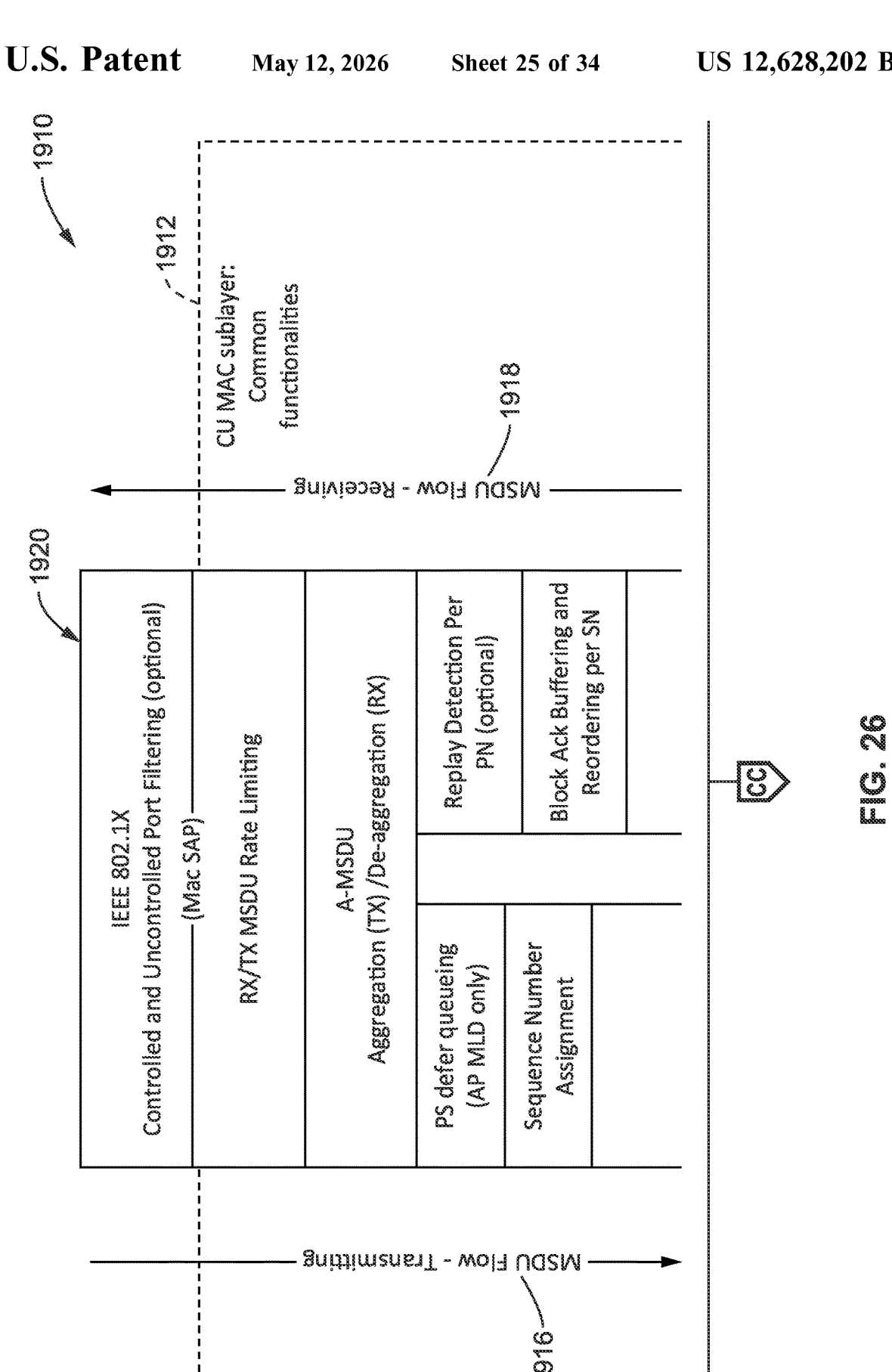
FIG. 26 through FIG. 28 is a data plane architecture for unicast data frames to be handled by decentralized decoding according to at least one embodiment of the present disclosure.
Figure 27:
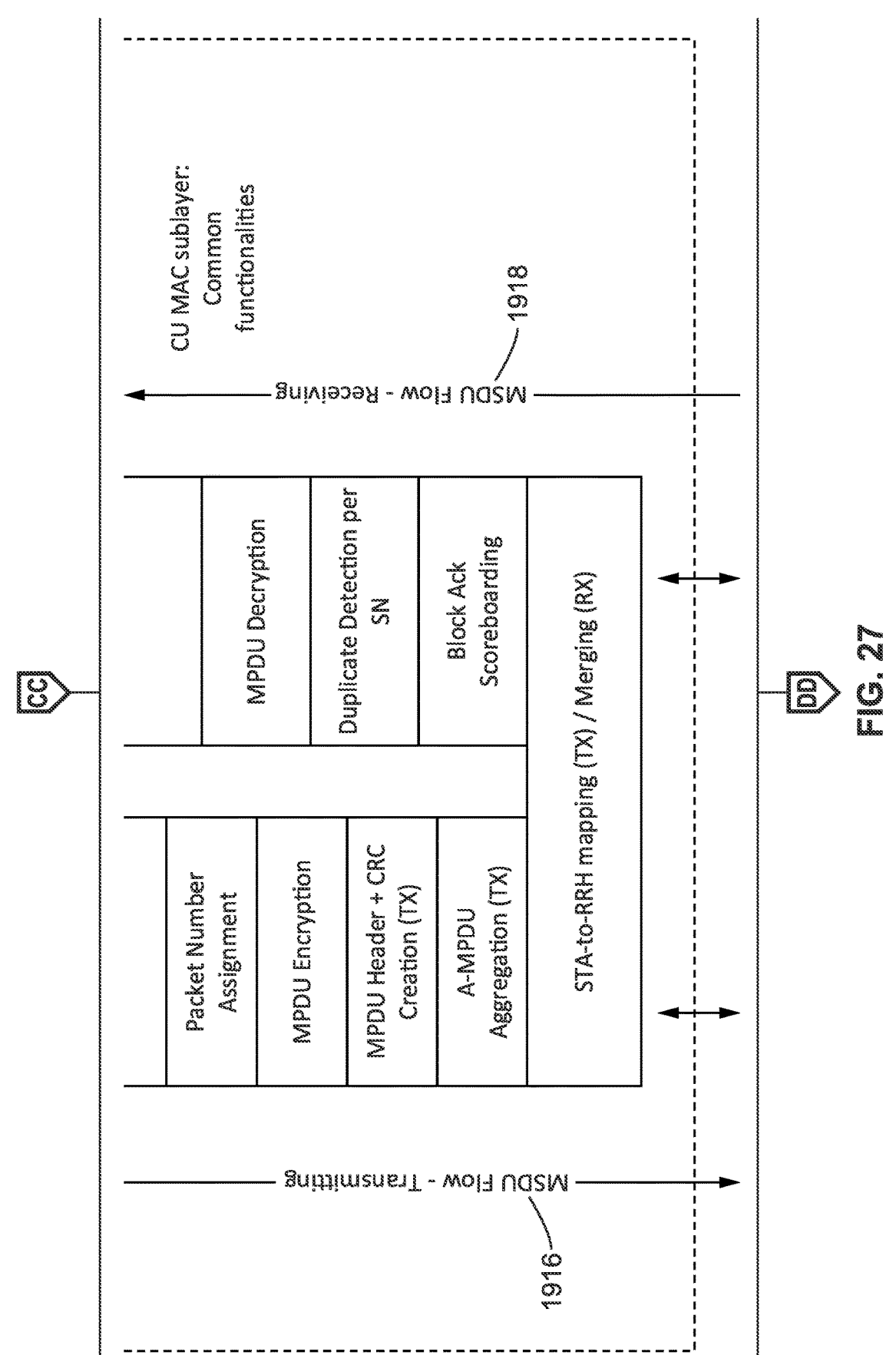
Figure 28:
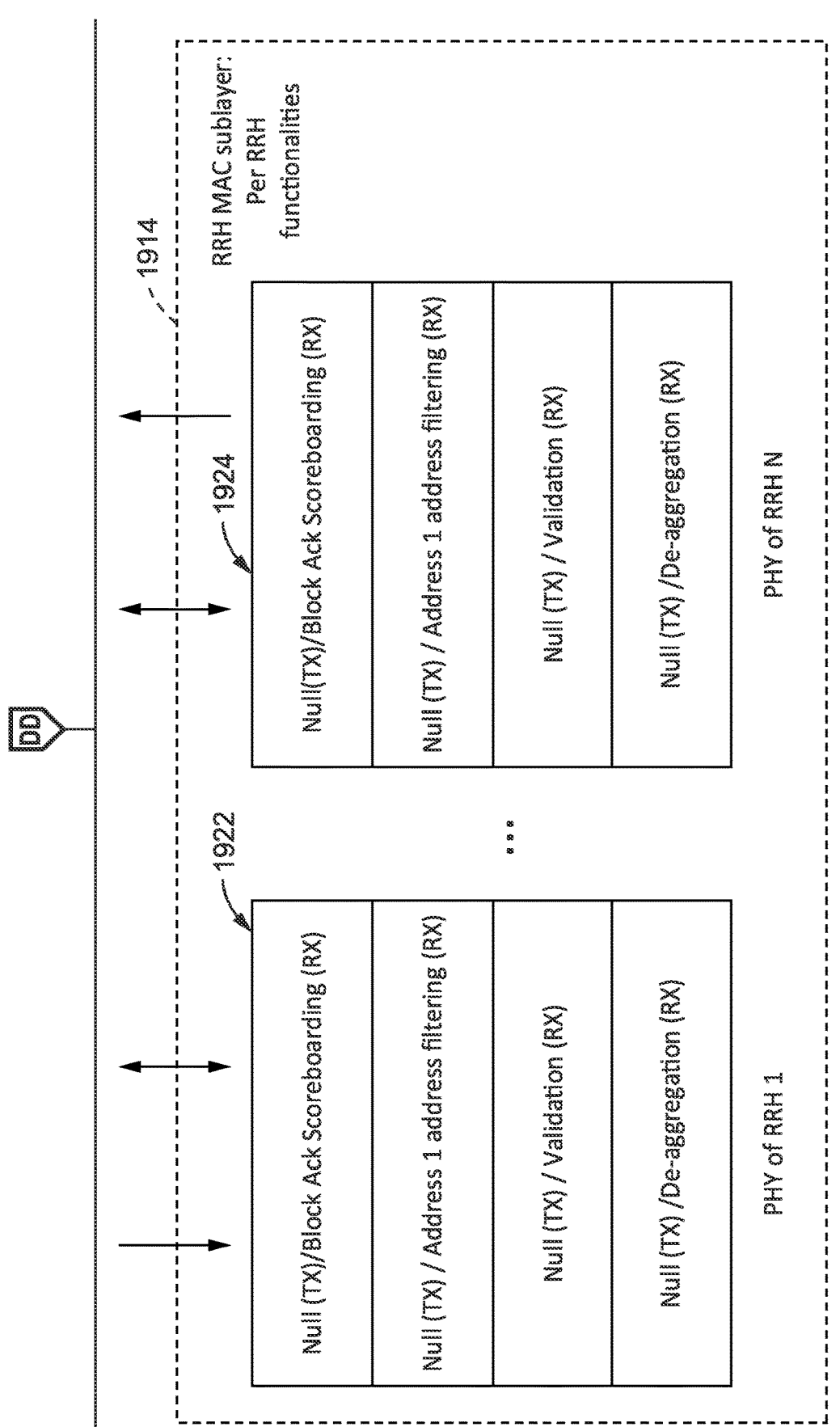

FIG. 26 through FIG. 28 illustrate an example embodiment 1910 of another MAC data plane architecture 1920 for unicast data frames to be handled by decentralized decoding. Compared with the previous example, the functionalities of transmitting MSDU flow at the RRH MAC sublayer in the previous example is implemented at the CU MAC sublayer 1912. The figures also depict MSDU flow 1916 for transmitting and MSDU flow 1918 for receiving, as well as RRH MAC sublayer 1914 per RRH functionalities. Additionally, is seen PHY of RRH1 1922, and PHY of RRH2 1924.

In at least one embodiment/mode/option the functionality of the MPDU header+CRC creation is implemented at either RRH MAC sublayer or CU MAC sublayer. If the functionality MPDU header+CRC creation is implemented at CU MAC sublayer, the functionality A-MPDU aggregation can be implemented at either RRH MAC sublayer or CU MAC sublayer. If the functionality MPDU header+CRC creation is implemented at RRH MAC sublayer, the functionality A-MPDU aggregation can only be implemented at RRH MAC sublayer.

4.5.2. Centralized Decoding

Figure 29:
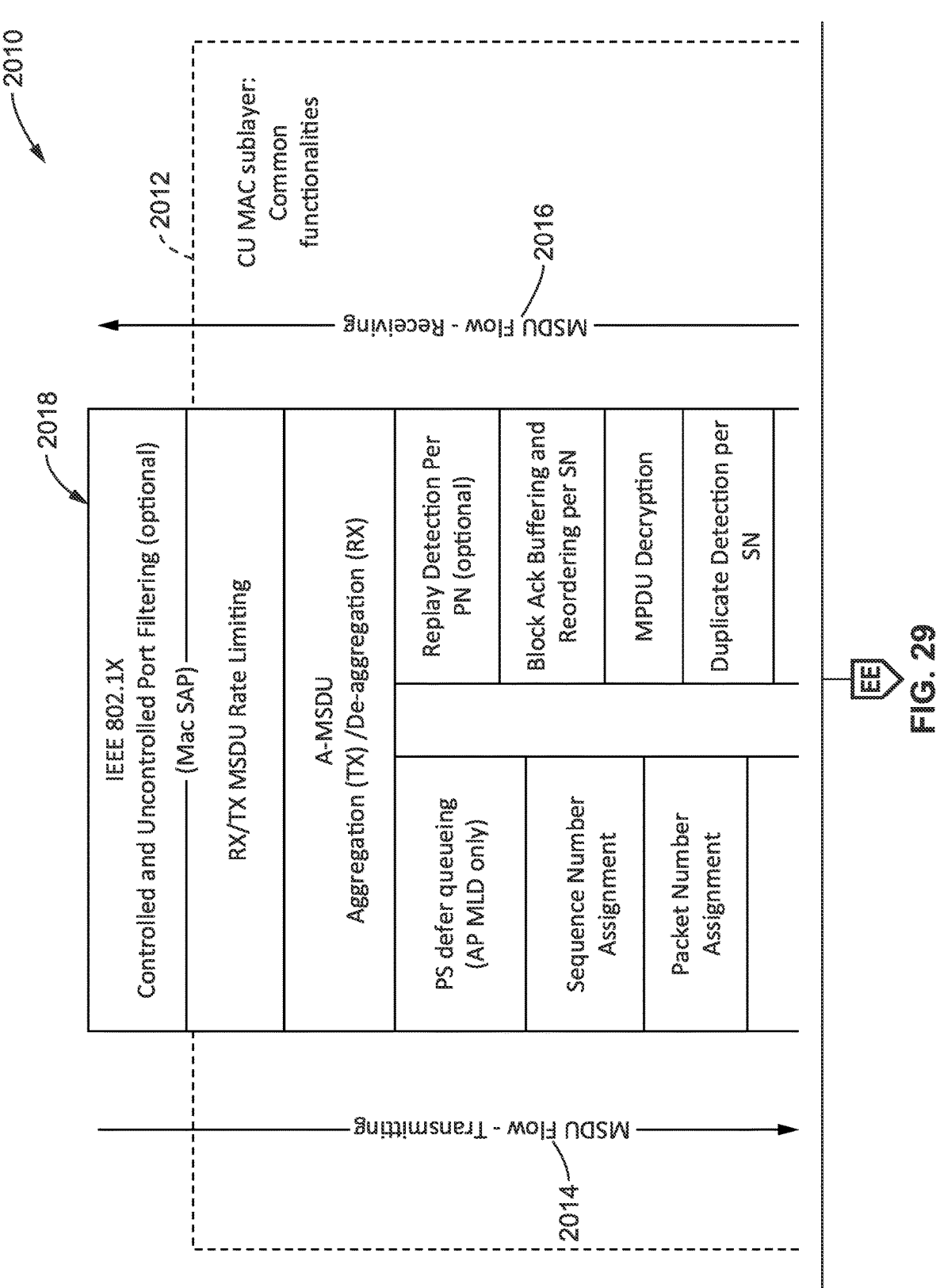
FIG. 29 through FIG. 30 is a data plane architecture for unicast data frames for centralized decoding (or non-legacy compatibility) according to at least one embodiment of the present disclosure.
Figure 30:
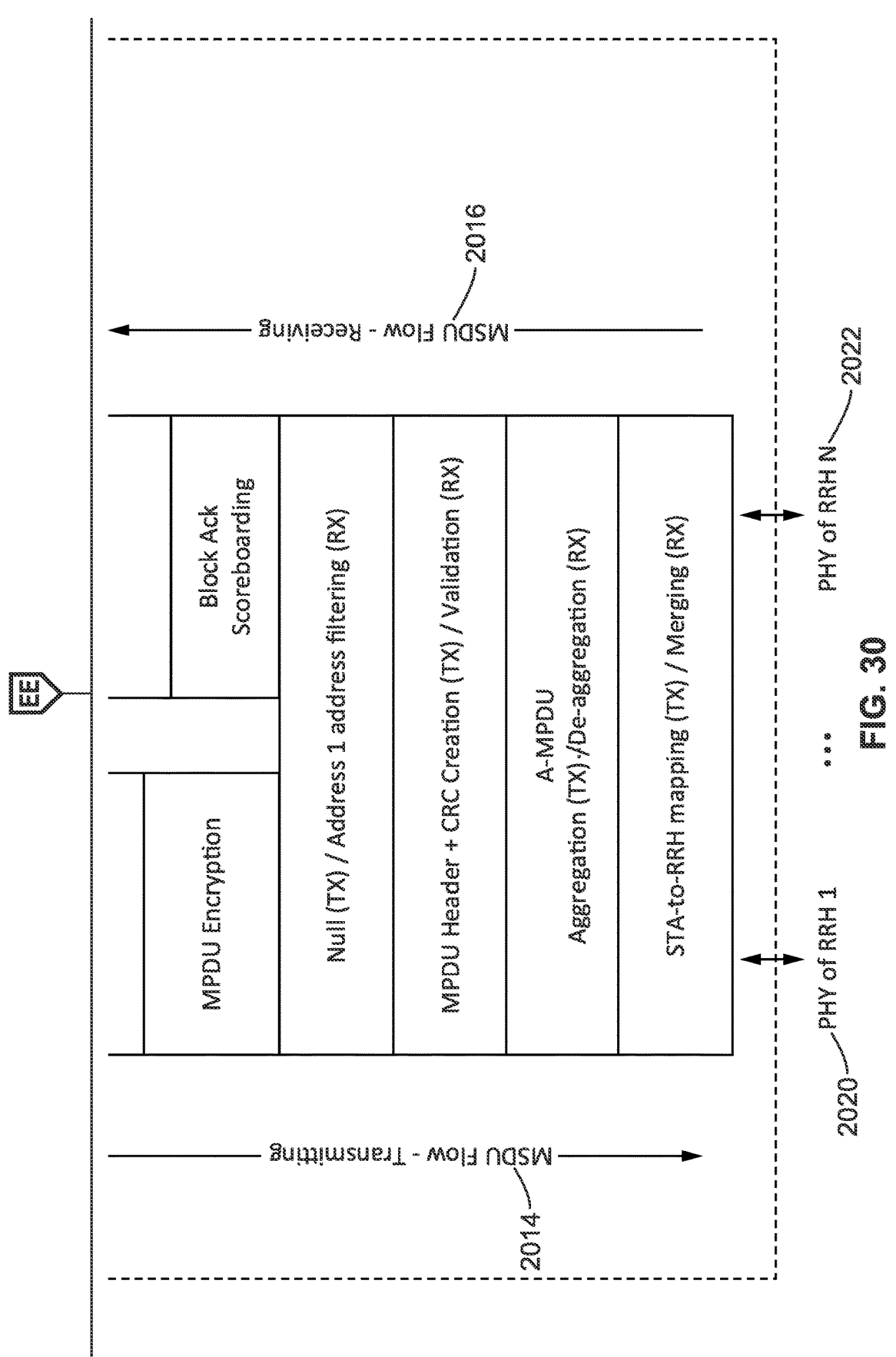

FIG. 29 and FIG. 30 illustrates an example embodiment 2010 of the MAC data plane architecture 2018 for unicast data frames for centralized decoding (or non-legacy compatibility). That is, the RRH will forward the MPDUs in the received PPDU to the CU for decoding. The functionalities are split by the CU MAC sublayer 2012 and RRH MAC sublayer.

It will be noted that in the centralized case, both upper MAC sublayer functions and lower MAC sublayer functions are all embedded in the CU, so the RRH only embeds with PHY functions and there are no MAC functions implemented in RRH.

Compared with the function split of the MAC data plane architecture that is decentralized decoding, all the functionalities of the MSDU flow are implemented at CU MAC sublayer.

During transmission 2014, an MSDU from the MAC SAP goes through the process shown in the left-hand side for transmitting a unicast data frame, then through the STA-to-RRH mapping to one or more PHY SAP 2020, 2022, of the RRHs.

During reception 2016, MPDUs originating from different PHY SAPs 2020, 2022 of each RRH first go through STA-to-RRH merging process at the CU MAC sublayer, then go through in the right-hand side for receiving a unicast data frame.

In at least one embodiment/mode/option the blocks between "Null (Tx)/Address 1 address filtering (Rx)" and "A-MPDU Aggregation (Tx)/De-aggregation (RX)" can be moved to be functionalities at RRH.

6.6. Process Flow Diagrams

Figure 31:
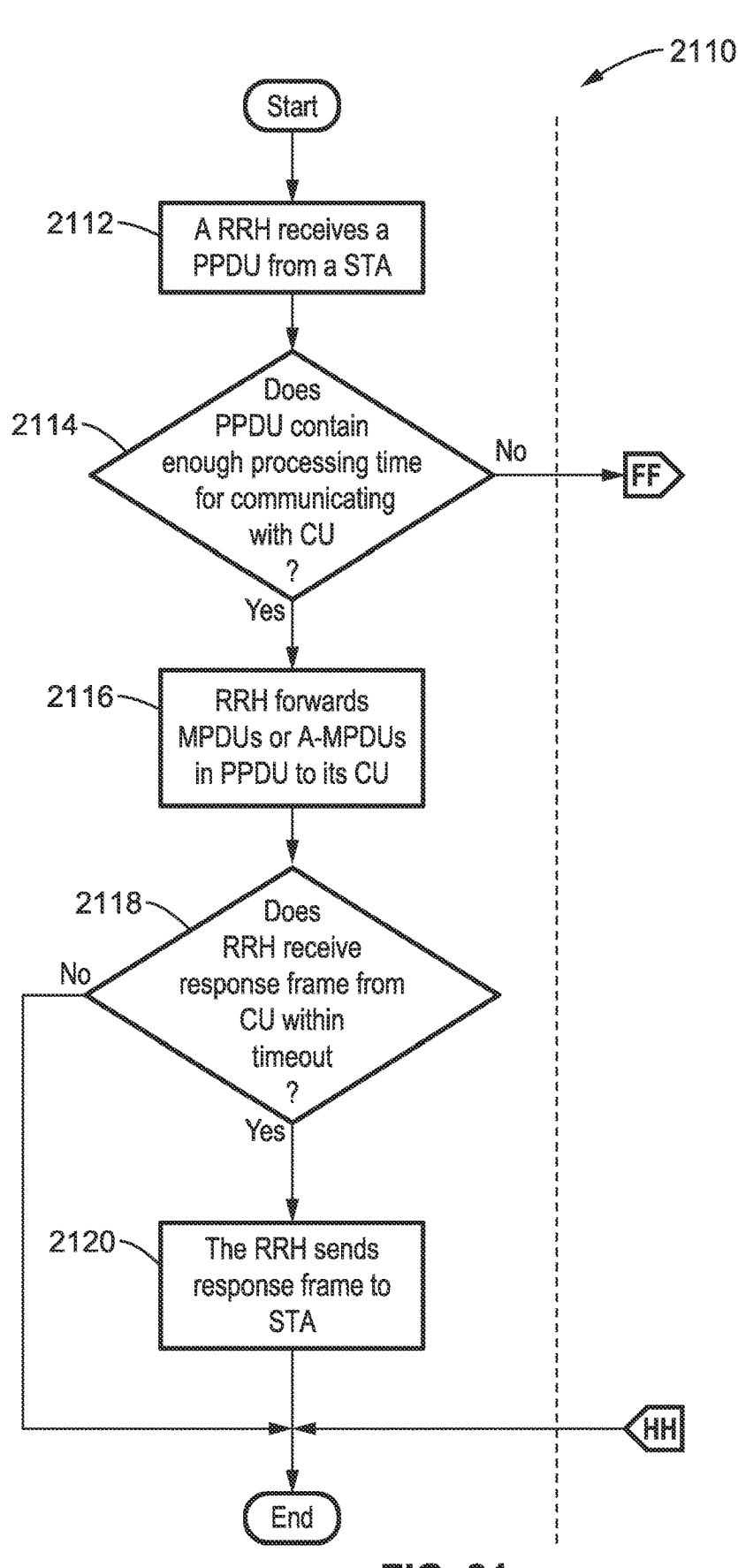
FIG. 31 and FIG. 32 is a flow diagram of a process when an RRH receives a PPDU according to at least one embodiment of the present disclosure.
Figure 32:
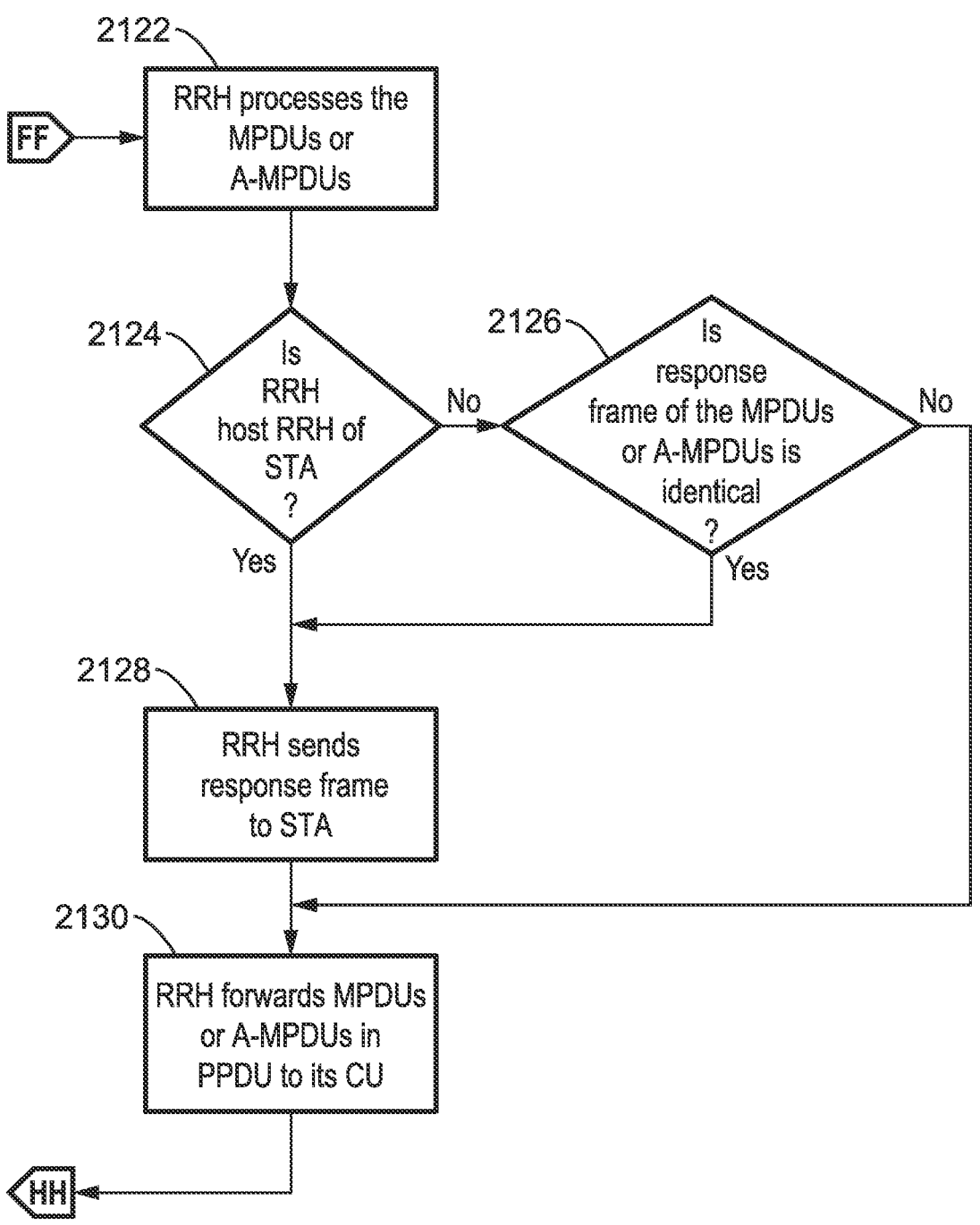

FIG. 31 and FIG. 32 illustrate an example embodiment 2110 of a process when an RRH receives a PPDU. When an RRH receives a PPDU 2112 from a STA, it should check 2114 if the PPDU spans sufficient processing time, for instance including a PE duration in the PPDU, for the RRH to communicate with, and receive a response from, the CU as to how to process the PPDU.

If the condition is met, and there is a sufficient duration of the PPDU to allow for the RRH to request (ask) the CU for the response to the PPDU, then the RRH forwards 2116 the frames (MPDUs or A-MPDUs) in the PPDU to its CU. A check 2118 then determines if a response is received from the CU within the timeout period.

If the RRH receives the feedback from the CU before the end of the PE duration, then the RRH sends 2120 a response frame to the STA and the process ends. Otherwise, if a response is not returned to check 2118 in the given time, then the RRH does not respond, and the process ends.

Returning now to consider the case at check 2114, when there not sufficient duration, such as no PE or the PE duration is not enough for the RRH to ask the CU for the response to the PPDU, then in FIG. 32 it is seen that the RRH processes (decodes) 2122 the MPDU or A-MPDUs without reaching out to the CU. A check 2124 is performed to determine if the RRH is the host RRH of the transmitter STA of the received PPDU.

If the condition is met, then execution reaches block 2128. Otherwise, if it is not met, but the response frame of the MPDUs or A-MPDUs is identical with condition 2126 being met, then it also reaches block 2128. At block 2128 the response frame is sent to the corresponding STA within a SIFS time, then at block 2130 it forwards the MPDUs or A-MPDUs in the PPDU to its CU and processing ends.

However, if at check 2126, if it is determined that the response frame of the MPDUs/A-MPDUs is not identical, then execution goes directly (skipping block 2128) to block 2130 and with the RRH being forwarded to the MPDUs or A-MPDUs in the PPDU to its CU and does not transmit a response PPDU.

Figure 33:
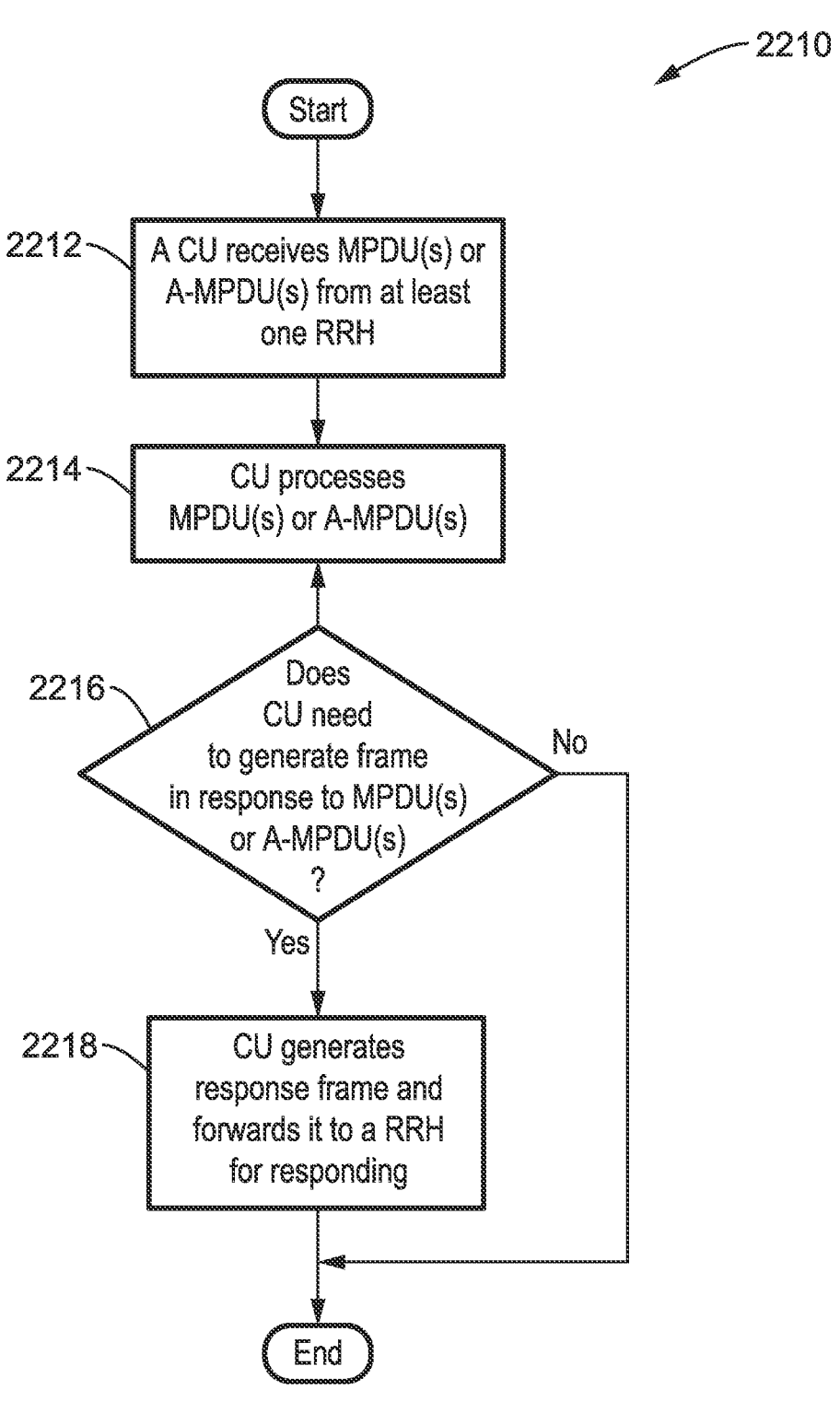
FIG. 33 is a flow diagram of a CU receiving a MPDU or A-MPDU according to at least one embodiment of the present disclosure.

FIG. 33 illustrates an example embodiment 2210 of a CU receiving a MPDU or A-MPDU. When the CU receives 2212 a MPDU or A-MPDU from at least one RRH, it processes 2214 the MPDU or A-MPDU as described in Section 4.5.

At check 2216 it is determined if the MPDU or A-MPDU requires a response. If a response is required, then the CU generates 2218 a response frame and forwards it to the corresponding RRH(s) for transmitting. Otherwise, if a response is not required, it skips block 2218 and processing ends.

FIG. 34 illustrates an example embodiment 2310 of a RRH transmitting a PPDU. After an RRH performs a clear channel assessment (CCA) 2312 and gains channel access, it sends a reservation PPDU to occupy the channel and requests 2314 the CU to forward MPDU(s) or A-MPDU(s) to transmit through the RRH.

Before the end of the reservation PPDU duration, the RRH receives 2316 the MPDUs or A-MPDUs that it will transmit in the next PPDU. The CU may also decide the transmission method of the PPDU, such as signal processing procedure for the coordinated transmission with other RRHs. Then, the RRH encapsulates 2318 the MPDUs or A-MPDUs in the PPDU and follows the signal processing procedure to transmit the PPDU through its PHY layer.

FIG. 35 illustrates an example embodiment 2410 of a CU transmitting MPDU or A-MPDU. When the CU obtains (gets) information 2412 that RRHs occupy the channel for transmitting, it forwards 2414 MPDUs or A-MPDUs to the RRH for transmitting. The CU may also decide the transmission method, such as signal processing of the PPDU, for the PPDU transmitting through the PHY layer of the RRH.

4.7. PPDU Format

FIG. 36 illustrates an example embodiment 2510 depicting a reservation PPDU format. The preamble of the reservation PPDU can be any type of PPDU's defined in IEEE 802.11. For example, the preamble can be the same as Null Data-Packet (NDP) when the data field is empty. However, the PE duration can be flexible in the PPDU to cover the RRT between CU and RRH.

If the reservation PPDU carries frames in the data field, then it should set those frames requiring no Ack.

When multiple RRHs transmit the reservation PPDU at the same time, they should transmit the identical reservation PPDU with the same scrambling seed to avoid collision.

FIG. 37 illustrates an example embodiment 2550 of an RRH PPDU format. The purpose of the RRH PPDU is to allow the RRH to identify whether the PPDU supports RRH features or not. In order to achieve this purpose, the following field is added in the preamble.

An RRH support field is added which is set to a first state (e.g., "1") to indicate that this PPDU supports RRH features; whereby the RRH can forward the MSDUs and A-MSDUs in the PPDU to the CU and allow the CU to decide the response to the PPDU. Otherwise, this field is set to a second state (e.g., "0"); whereby the RRH should decode the MSDUs and A-MSDUs in the PPDU by itself and generate the response to send if needed.

A STA ID field is set to identify the transmitter STA of the PPDU. This field can be set to the AID or partial AID of the transmitter STA. This field can be used to identify whether the transmitter supports RRH features or not as an RRH support field. This field can also be used to identify whether the RRH is the host RRH of the transmitter STA of the RRH. If the RRH is the host RRH of the transmitter STA, then it should respond to the PPDU; otherwise, it does not respond.

A Round Trip Time (RTT) field is set to indicate the round-trip time the PPDU supports for the communication between CU and RRH. For example, it can be used to indicate that the PPDU adds RTT in the PE field of the PPDU. If the RTT is longer than RTT time between the CU and RRH, then the RRH can forward the MSDUs and A-MSDUs in the PPDU to request a response from the CU. Otherwise, RRH has insufficient time to reach out to the CU for its response.

A PE duration field indicates the duration of PE field in the RRH PPDU. The receiver RRH (i.e., the RRH is the intended recipient of the PPDU and receives the PPDU) of the RRH PPDU can decide whether the duration of the PE field in the RRH PPDU is sufficiently long to allow for it to communicate with the CU. If the duration of the PE field is long enough, then the receiver RRH can forward the frames in the RRH PPDU to the CU for centralized decoding. Otherwise, the receiver RRH should decode the frames by itself.

An Identical response field is set to a first state (e.g., "1") to indicate that the response frame to the PPDU is unique or identical. Thus, any RRH which receives the RRH PPDU will correctly respond with a PPDU carrying the same response frame, such as an Ack frame. Then, the receiver RRH may decode the frames in the PPDU by itself and it responds if the RRH PPDU has been received correctly. If the RRH PPDU is not received correctly, then the RRH does not respond. If this field is set to a second state (e.g., "0"), then only the host RRH of the transmitter STA of the RRH PPDU responds if the duration of the PE field is not sufficient for the RRH to communicate with the CU. If the duration of the PE field is sufficient for the RRH to communicate with the CU, then the receiver RRH should allow the CU to decide whether it should respond or not.

5. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless station (STA) configured as a remote radio head (RRH), with at least one RRH having a central unit (CU) as an RRH access point (AP), for wirelessly communicating over links to a channel with other wireless STAs and RRHs using a carrier sense multiple access/collision avoidance (CSMA/CA) mechanism following a distributed coordination function (DCF) or enhanced distributed channel access (EDCA) mechanism for random channel access on all the links; (b) a processor coupled to said wireless STA for operating on the WLAN for performing transmission of frames between medium access control (MAC) layers of the IEEE 802.11 network, wherein frames are encapsulated as physical layer protocol data units (PP-DUs) and a physical (PHY) layer of the IEEE 802.11 network transmits and receives the physical signal of the PPDU through a channel; (c) a non-transitory memory storing instructions executable by the processor for communicating with other STAs; and (d) wherein said instructions, when executed by the processor, perform steps of a wireless communications protocol for said STA circuit, comprising: (d)(i) wherein said RRH AP and at least one of its remote radio heads (RRHs) are configured for being located at different geographic locations; (d)(ii) wherein the functionalities of the MAC and PHY layer of the RRH AP are split between CU and RRH; (d)(iii) wherein the CU performs exchanging frames between the MAC layers; and (d)(iv) wherein the RRH transmits and receives the physical signal through the channel.

An apparatus for wireless communication in a network, the apparatus comprising: (a) a wireless station (STA) configured as a remote radio head (RRH), with at least one RRH having a central unit (CU) as an RRH AP, for wirelessly communicating over links to a channel with other wireless STAs and RRHs using a carrier sense multiple access/collision avoidance (CSMA/CA) mechanism following a distributed coordination function (DCF) or enhanced distributed channel access (EDCA) mechanism for random channel access on all the links; (b) a processor coupled to said wireless communication circuit for operating on the WLAN for performing transmission of frames between medium access control (MAC) layers of the IEEE 802.11 network, wherein frames are encapsulated as physical layer protocol data units (PPDUs) and a physical (PHY) layer of the IEEE 802.11 network transmits and receives the physical signal of the PPDU through the channel; (c) a non-transitory memory storing instructions executable by the processor for communicating with other STAs; and (d) wherein said instructions, when executed by the processor, perform steps of a wireless communications protocol for said STA circuit, comprising: (d)(i) wherein said RRH AP and at least one of its remote radio heads (RRHs) are configured for being located at different geographic locations; (d)(ii) wherein an RRH performs transmission of PPDUs between the PHY layer of the IEEE 802.11 network; (d)(iii) wherein the functionalities of the MAC and PHY layer of the RRH AP are split between CU and RRH; (d)(iv) wherein the CU performs exchanging frames between the MAC layers; (d)(v) wherein the RRH transmits and receives the physical signal through the channel; and (d)(vi) wherein multiple RRHs obtaining a TXOP at the same time transmit reservation PPDUs to occupy the channel and the CU determines how the PPDUs are to be transmitted through the RRHs.

A method of performing wireless communication in a network, the apparatus comprising: (a) communicating between stations of a wireless network having stations (STAs) configuring as remote radio head (RRHs), with at least one RRH having a central unit (CU) as an RRH Access Point (AP) having at least one of its remote radio heads (RRHs) configured for being located at a different geographic location, for wirelessly communicating over links to a channel with other wireless STAs and RRHs using a carrier sense multiple access/collision avoidance (CSMA/CA) mechanism following a distributed coordination function (DCF) or enhanced distributed channel access (EDCA) mechanism for random channel access on all the links; (b) performing transmission of frames between medium access control (MAC) layers of the IEEE 802.11 network, wherein frames are encapsulated as physical layer protocol data units (PPDUs) and a physical (PHY) layer of the IEEE 802.11 network transmits and receives the physical signal of the PPDU through channel; (c) splitting functionalities of the MAC and PHY layer of the RRH AP between CU and RRH, with the CU performing an exchange of frames between the MAC layers, and the RRH performing transmissions and receiving physical signals through the channel.

A wireless communication apparatus performing transmission of frames (MPDU or A-MPDU) between MAC layers of the IEEE 802.11 network, wherein frames are encapsulated as PPDUs and the PHY layer of the IEEE 802.11 network transmits and receives the physical signal of the PPDU through channel, CSMA/CA is used for channel contention which follows the DCF (or EDCA mechanism) timing relationship of the IEEE 802.11 network, comprising: (a) an AP, denoted as RRH AP, consists of a central unit (CU) and at least one remote radio head (RRH) which are at different geographic locations; (b) the functionalities of the MAC and PHY layer of the RRH AP are split between CU and RRH, with the CU performing exchanging of frames between the MAC layers, while the RRH transmits and receives the physical signal through the channel.

The apparatus or method of any preceding implementation, wherein RRH performs transmission of PPDUs between the PHY layer of the IEEE 802.11 network.

The apparatus or method of any preceding implementation, wherein RRH AP transmitting to a STA: (a) CU forwards the frames to RRH; and (b) RRH encapsulates the frames to PPDUs and transmits the PPDUs through the channel.

The apparatus or method of any preceding implementation, wherein RRH AP receiving from a STA comprising: (a) RRH receives PPDU from the channel; and (b) RRH decodes the PPDU and forwards the frames in the PPDU to the CU.

The apparatus or method of any preceding implementation, wherein an RRH obtaining a TXOP generates and transmit a reservation PPDU to occupy the channel and obtains the frames from the CU to transmit during the reservation PPDU.

The apparatus or method of any preceding implementation, wherein multiple RRHs obtaining a TXOP at a same time perform transmitting reservation PPDUs to occupy the channel and the CU determines how to transmit PPDUs through those RRHs.

The apparatus or method of any preceding implementation, wherein a RRH receiving a PPDU from a STA commences to forward frames in the PPDU when it receives the PPDU signal and await a decision from the CU on whether the RRH should continue receiving.

The apparatus or method of any preceding implementation, wherein a RRH receiving a PPDU from a STA starts to forward the frames in the PPDU when receiving the PPDU signal and await a decision from the CU of whether the RRH is to transmit an immediate response for the PPDU.

The apparatus or method of any preceding implementation, wherein a RRH receiving a PPDU from a STA decodes the frames in the PPDU and generates an immediate response to send within a SIFS time.

The apparatus or method of any preceding implementation, wherein a RRH receiving a PPDU with packet extension (PE) that is longer than a round-trip time (RTT) between CU and RRH forwards the frames in the PPDU to the CU and await response frames from the CU in response to the PPDU.

The apparatus or method of any preceding implementation, wherein multiple RRH receiving a PPDU with packet extension (PE), that is longer than round-trip time (RTT) between CU and RRH, proceed to forward the frames in the PPDU to the CU and await the response frames from the CU in response to the PPDU.

The apparatus or method of any preceding implementation, wherein wherein the defined RRH AP performs as a non-AP STA.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, upper and lower, left and right, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to +5%, less than or equal to +4%, less than or equal to +3%, less than or equal to ±2%, less than or equal to ±1%, less than or equal to ±0.5%, less than or equal to +0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to 0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, the apparatus comprising:
(a) a wireless station (STA) configured as a remote radio head (RRH), with at least one RRH having a central unit (CU) as an RRH access point (AP), for wirelessly communicating over links to a channel with other wireless STAs and RRHs using a carrier sense multiple access/collision avoidance (CSMA/CA) mechanism following a distributed coordination function (DCF) or enhanced distributed channel access (EDCA) mechanism for random channel access on all the links;
(b) a processor coupled to said wireless STA for operating on the WLAN for performing transmission of frames between medium access control (MAC) layers of the IEEE 802.11 network, wherein frames are encapsulated as physical layer protocol data units (PPDUs) and a physical (PHY) layer of the IEEE 802.11 network transmits and receives the physical signal of the PPDU through a channel;

(c) a non-transitory memory storing instructions executable by the processor for communicating with other STAs; and (d) wherein said instructions, when executed by the processor, perform steps of a wireless communications protocol for said STA circuit, comprising:

(i) wherein said RRH AP and at least one of its remote radio heads (RRHs) are configured for being located at different geographic locations;

(ii) wherein the functionalities of the MAC and PHY layer of the RRH AP are split between CU and RRH;

(iii) wherein the CU performs exchanging frames between the MAC layers;

(iv) wherein the RRH transmits and receives the physical signal through the channel; and (v) wherein RRH AP transmitting to a STA: (a) CU forwards the frames to RRH; and (b) RRH encapsulates the frames to PPDUs and transmits the PPDUs through the channel.

2. The apparatus of claim 1, wherein RRH performs transmission of PPDUs between the PHY layer of the IEEE 802.11 network.

3. The apparatus of claim 1, wherein RRH AP receiving from a STA comprising: (a) RRH receives PPDU from the channel; and (b) RRH decodes the PPDU and forwards the frames in the PPDU to the CU.

4. The apparatus of claim 1, wherein an RRH obtaining a TXOP generates and transmits a reservation PPDU to occupy the channel and obtains the frames from the CU to transmit during the reservation PPDU.

5. The apparatus of claim 1, wherein multiple RRHs obtaining a TXOP at a same time perform transmitting reservation PPDUs to occupy the channel and the CU determines how to transmit PPDUs through those RRHs.

6. The apparatus of claim 1, wherein a RRH receiving a PPDU from a STA commences to forward frames in the PPDU when it receives the PPDU signal and awaits a decision from the CU on whether the RRH should continue receiving.

7. The apparatus of claim 1, wherein a RRH receiving a PPDU from a STA starts to forward the frames in the PPDU when receiving the PPDU signal and awaits a decision from the CU of whether the RRH is to transmit an immediate response for the PPDU.

8. The apparatus of claim 1, wherein a RRH receiving a PPDU from a STA decodes the frames in the PPDU and generates an immediate response to send within a SIFS time.

9. The apparatus of claim 1, wherein a RRH receiving a PPDU with packet extension (PE) that is longer than a round-trip time (RTT) between CU and RRH forwards the frames in the PPDU to the CU and awaits response frames from the CU in response to the PPDU.

10. The apparatus of claim 1, wherein multiple RRH receiving a PPDU with packet extension (PE), that is longer than round-trip time (RTT) between CU and RRH, proceed to forward the frames in the PPDU to the CU and await the response frames from the CU in response to the PPDU.

11. The apparatus of claim 1, wherein the defined RRH AP performs as a non-AP STA.

12. A method of performing wireless communication in a network, the apparatus comprising:

(a) communicating between stations of a wireless network having stations (STAs) configuring as remote radio head (RRHs), with at least one RRH having a central unit (CU) as an RRH Access Point (AP) having at least one of its remote radio heads (RRHs) configured for being located at a different geographic location, for wirelessly communicating over links to a channel with other wireless STAs and RRHs using a carrier sense multiple access/collision avoidance (CSMA/CA) mechanism following a distributed coordination function (DCF) or enhanced distributed channel access (EDCA) mechanism for random channel access on all the links;

(b) performing transmission of frames between medium access control (MAC) layers of the IEEE 802.11 network, wherein frames are encapsulated as physical layer protocol data units (PPDUs) and a physical (PHY) layer of the IEEE 802.11 network transmits and receives the physical signal of the PPDU through channel;

(c) splitting functionalities of the MAC and PHY layer of the RRH AP between CU and RRH, with the CU performing an exchange of frames between the MAC layers, and the RRH performing transmissions and receiving physical signals through the channel; and (d) wherein one or more RRHs occupy the channel and: (a) wherein responsive to determining it is a single RRH obtaining a TXOP, the RRH generates and transmits a reservation PPDU to occupy the channel and obtains the frames from the CU to transmit during the reservation PPDU; or (b) wherein responsive to determining that multiple RRHs are obtaining a TXOP at a same time, these RRHs perform transmitting reservation PPDUs to occupy the channel and the CU determines how to transmit PPDUs through those RRHs.

13. An apparatus for wireless communication in a network, the apparatus comprising:

(a) a wireless station (STA) configured as a remote radio head (RRH), with at least one RRH having a central unit (CU) as an RRH access point (AP), for wirelessly communicating over links to a channel with other wireless STAs and RRHs using a carrier sense multiple access/collision avoidance (CSMA/CA) mechanism following a distributed coordination function (DCF) or enhanced distributed channel access (EDCA) mechanism for random channel access on all the links;

(b) a processor coupled to said wireless STA for operating on the WLAN for performing transmission of frames between medium access control (MAC) layers of the IEEE 802.11 network, wherein frames are encapsulated as physical layer protocol data units (PPDUs) and a physical (PHY) layer of the IEEE 802.11 network transmits and receives the physical signal of the PPDU through a channel;

(c) a non-transitory memory storing instructions executable by the processor for communicating with other STAs; and (d) wherein said instructions, when executed by the processor, perform steps of a wireless communications protocol for said STA circuit, comprising:

(i) wherein said RRH AP and at least one of its remote radio heads (RRHs) are configured for being located at different geographic locations;

(ii) wherein the functionalities of the MAC and PHY layer of the RRH AP are split between CU and RRH;

(iii) wherein the CU performs exchanging frames between the MAC layers;

(iv) wherein the RRH transmits and receives the physical signal through the channel; and (v) wherein RRH AP receiving from a STA comprising: (a) RRH receives PPDU from the channel; and (b) RRH decodes the PPDU and forwards the frames in the PPDU to the CU.

14. An apparatus for wireless communication in a network, the apparatus comprising:

(a) a wireless station (STA) configured as a remote radio head (RRH), with at least one RRH having a central unit (CU) as an RRH access point (AP), for wirelessly communicating over links to a channel with other wireless STAs and RRHs using a carrier sense multiple access/collision avoidance (CSMA/CA) mechanism following a distributed coordination function (DCF) or enhanced distributed channel access (EDCA) mechanism for random channel access on all the links;

(b) a processor coupled to said wireless STA for operating on the WLAN for performing transmission of frames between medium access control (MAC) layers of the IEEE 802.11 network, wherein frames are encapsulated as physical layer protocol data units (PPDUs) and a physical (PHY) layer of the IEEE 802.11 network transmits and receives the physical signal of the PPDU through a channel;

(c) a non-transitory memory storing instructions executable by the processor for communicating with other STAs; and (d) wherein said instructions, when executed by the processor, perform steps of a wireless communications protocol for said STA circuit, comprising:

(i) wherein said RRH AP and at least one of its remote radio heads (RRHs) are configured for being located at different geographic locations;

(ii) wherein the functionalities of the MAC and PHY layer of the RRH AP are split between CU and RRH;

(iii) wherein the CU performs exchanging frames between the MAC layers;

(iv) wherein the RRH transmits and receives the physical signal through the channel; and (v) (a) wherein an RRH obtaining a TXOP generates and transmits a reservation PPDU to occupy the channel and obtains the frames from the CU to transmit during the reservation PPDU; or (b) wherein multiple RRHs obtaining a TXOP at a same time perform transmitting reservation PPDUs to occupy the channel and the CU determines how to transmit PPDUs through those RRHs.

15. An apparatus for wireless communication in a network, the apparatus comprising:

(a) a wireless station (STA) configured as a remote radio head (RRH), with at least one RRH having a central unit (CU) as an RRH access point (AP), for wirelessly communicating over links to a channel with other wireless STAs and RRHs using a carrier sense multiple access/collision avoidance (CSMA/CA) mechanism following a distributed coordination function (DCF) or enhanced distributed channel access (EDCA) mechanism for random channel access on all the links;

(b) a processor coupled to said wireless STA for operating on the WLAN for performing transmission of frames between medium access control (MAC) layers of the IEEE 802.11 network, wherein frames are encapsulated as physical layer protocol data units (PPDUs) and a physical (PHY) layer of the IEEE 802.11 network transmits and receives the physical signal of the PPDU through a channel;

(c) a non-transitory memory storing instructions executable by the processor for communicating with other STAs; and (d) wherein said instructions, when executed by the processor, perform steps of a wireless communications protocol for said STA circuit, comprising:

(i) wherein said RRH AP and at least one of its remote radio heads (RRHs) are configured for being located at different geographic locations;

(ii) wherein the functionalities of the MAC and PHY layer of the RRH AP are split between CU and RRH;

(iii) wherein the CU performs exchanging frames between the MAC layers;

(iv) wherein the RRH transmits and receives the physical signal through the channel; and (v) wherein a RRH receiving a PPDU from a STA commences to forward frames in the PPDU when it receives the PPDU signal and awaits a decision from the CU on whether the RRH should continue receiving, or wherein a RRH receiving a PPDU from a STA starts to forward the frames in the PPDU when receiving the PPDU signal and awaits a decision from the CU of whether the RRH is to transmit an immediate response for the PPDU.

16. An apparatus for wireless communication in a network, the apparatus comprising:

(a) a wireless station (STA) configured as a remote radio head (RRH), with at least one RRH having a central unit (CU) as an RRH access point (AP), for wirelessly communicating over links to a channel with other wireless STAs and RRHs using a carrier sense multiple access/collision avoidance (CSMA/CA) mechanism following a distributed coordination function (DCF) or enhanced distributed channel access (EDCA) mechanism for random channel access on all the links;

(b) a processor coupled to said wireless STA for operating on the WLAN for performing transmission of frames between medium access control (MAC) layers of the IEEE 802.11 network, wherein frames are encapsulated as physical layer protocol data units (PPDUs) and a physical (PHY) layer of the IEEE 802.11 network transmits and receives the physical signal of the PPDU through a channel;

(c) a non-transitory memory storing instructions executable by the processor for communicating with other STAs; and (d) wherein said instructions, when executed by the processor, perform steps of a wireless communications protocol for said STA circuit, comprising:

(i) wherein said RRH AP and at least one of its remote radio heads (RRHs) are configured for being located at different geographic locations;

(ii) wherein the functionalities of the MAC and PHY layer of the RRH AP are split between CU and RRH;

(iii) wherein the CU performs exchanging frames between the MAC layers;

(iv) wherein the RRH transmits and receives the physical signal through the channel; and (v) wherein a RRH receiving a PPDU from a STA decodes the frames in the PPDU and generates an immediate response to send within a SIFS time, or wherein a RRH receiving a PPDU with packet extension (PE) that is longer than a round-trip time (RTT) between CU and RRH forwards the frames in the PPDU to the CU and awaits response frames from the CU in response to the PPDU, or wherein multiple RRH receiving a PPDU with packet extension (PE), that is longer than round-trip time (RTT) between CU and RRH proceed to forward the frames in the PPDU to the CU and awaits the response frames from the CU in response to the PPDU.

17. An apparatus for wireless communication in a network, the apparatus comprising:

(a) a wireless station (STA) configured as a remote radio head (RRH), with at least one RRH having a central unit (CU) as an RRH access point (AP), for wirelessly communicating over links to a channel with other wireless STAs and RRHs using a carrier sense multiple access/collision avoidance (CSMA/CA) mechanism following a distributed coordination function (DCF) or enhanced distributed channel access (EDCA) mechanism for random channel access on all the links;

(b) a processor coupled to said wireless STA for operating on the WLAN for performing transmission of frames between medium access control (MAC) layers of the IEEE 802.11 network, wherein frames are encapsulated as physical layer protocol data units (PPDUs) and a physical (PHY) layer of the IEEE 802.11 network transmits and receives the physical signal of the PPDU through a channel;

(c) a non-transitory memory storing instructions executable by the processor for communicating with other STAs; and (d) wherein said instructions, when executed by the processor, perform steps of a wireless communications protocol for said STA circuit, comprising:

(i) wherein said RRH AP and at least one of its remote radio heads (RRHs) are configured for being located at different geographic locations;

(ii) wherein the functionalities of the MAC and PHY layer of the RRH AP are split between CU and RRH;

(iii) wherein the CU performs exchanging frames between the MAC layers;

(iv) wherein the RRH transmits and receives the physical signal through the channel; and (v) wherein the defined RRH AP performs as a non-AP STA.

* * * * *